(12) United States Patent
Madurawe

(10) Patent No.: US 10,033,947 B2
(45) Date of Patent: Jul. 24, 2018

(54) MULTI-PORT IMAGE PIXELS

(71) Applicant: SEMICONDUCTOR COMPONENTS INDUSTRIES, LLC, Phoenix, AZ (US)

(72) Inventor: Raminda Madurawe, Sunnyvale, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 22 days.

(21) Appl. No.: 15/152,742

(22) Filed: May 12, 2016

(65) Prior Publication Data
US 2017/0126993 A1 May 4, 2017

Related U.S. Application Data

(60) Provisional application No. 62/250,541, filed on Nov. 4, 2015.

(51) Int. Cl.
| H04N 5/353 | (2011.01) |
| H04N 5/262 | (2006.01) |
| H04N 5/355 | (2011.01) |
| H04N 5/378 | (2011.01) |
| H04N 5/3745 | (2011.01) |

(52) U.S. Cl.
CPC .......... *H04N 5/355* (2013.01); *H04N 5/3535* (2013.01); *H04N 5/378* (2013.01); *H04N 5/37457* (2013.01)

(58) Field of Classification Search
CPC ...... H04N 5/378; H04N 5/374; H04N 5/3696; H04N 5/355; H04N 5/3535; H04N 5/37457
See application file for complete search history.

(56) References Cited

U.S. PATENT DOCUMENTS

| 6,115,065 A | 9/2000 | Yadid-Pecht et al. |
| 6,809,768 B1* | 10/2004 | Merrill .................. H04N 3/155 |
| | | 257/229 |
| 7,050,094 B2 | 5/2006 | Krymski |
| 7,518,645 B2* | 4/2009 | Farrier .............. H01L 27/14603 |
| | | 250/208.1 |
| 7,804,537 B2* | 9/2010 | Storm .................... H04N 5/335 |
| | | 250/208.1 |
| 8,564,705 B2 | 10/2013 | Cieslinski |
| 2011/0080500 A1 | 4/2011 | Wang et al. |

(Continued)

*Primary Examiner* — Twyler Haskins
*Assistant Examiner* — Carramah J Quiett
(74) *Attorney, Agent, or Firm* — Treyz Law Group, P.C.; Zachary D. Hadd

(57) ABSTRACT

An imaging system may include multi-port pixels. A multi-port pixel may include a photodiode that generates electrical charge in response to received light and a plurality of access ports that couple the electrical charge onto one of a corresponding plurality of pixel output lines. The photodiode may generate electrical charge for one or more different integration times while a frame is being captured. Charge generated during the different integration times may be coupled onto different respective pixel output lines through different respective access ports. Multiple pixels in a given column of the pixel array may simultaneously couple charge generated during different integration times onto different pixel output lines through different access ports.

17 Claims, 7 Drawing Sheets

(56) References Cited

U.S. PATENT DOCUMENTS

| | | | |
|---|---|---|---|
| 2011/0215223 A1* | 9/2011 | Unagami | H01L 27/148 250/208.1 |
| 2011/0234876 A1 | 9/2011 | Leconte | |
| 2013/0135486 A1* | 5/2013 | Wan | H04N 5/765 348/207.99 |
| 2016/0156862 A1* | 6/2016 | Yoshimura | H04N 5/35563 348/308 |

* cited by examiner

MULTI-PORT IMAGE PIXELS

CROSS-REFERENCE TO RELATED APPLICATIONS

This application claims priority to U.S. Provisional Application No. 62/250,541, filed on Nov. 4, 2015, entitled "Multi-Port Image Pixels," invented by Raminda Madurawe, and is incorporated herein by reference and priority thereto for common subject matter is hereby claimed.

BACKGROUND

This relates generally to imaging devices, and more particularly, to imaging devices having multi-port image pixels.

Image sensors are commonly used in electronic devices such as cellular telephones, cameras, and computers to capture images. In a typical arrangement, an electronic device is provided with an array of image pixels arranged in pixel rows and pixel columns. The image pixels contain a photodiode for generating charge in response to image light. Circuitry is commonly coupled to each pixel column for reading out image signals from the image pixels.

In certain applications, it may be desirable to increase the dynamic range of an image sensor, which is generally limited by the highest and lowest signal levels that a photodiode in a pixel of the image sensor can generate. The saturation full well (SFW) of the photodiode generally limits the highest signal that the photodiode can generate, and noise due to dark current (DC) generally limits the lowest signal that the photodiode can generate. In some arrangements, different integration times are used for different pixels in the pixel array in an attempt to improve the dynamic range of the image sensor. In some arrangements, different photodiode geometries are used for different pixels in the pixel array in an attempt to improve the dynamic range of the image sensor.

However, using multiple pixels to detect high and low levels of light incident upon the photodiode generates location disparity in the high and low signals, as the same photodiode does not generate both the high and low signals (i.e., the photodiodes that generate the high and low signals are adjacent or otherwise spatially separated). Such spatial separation violates the spatial frequency uniformity and Nyquest cut-off frequency of the two photodiodes that form the basis for image reconstruction from the sampled signals. Using multiple different integration times within the same pixel for sampling is also difficult to implement because the maximum amount of time for which charge can be generated by the pixels and the time sequencing requirements in a given row are tied to the frame readout time limit to prevent motion blur (i.e., the maximum integration time cannot be too high, or else motion artifacts will occur). Lowering the integration time to avoid such artifacts reduces the sensitivity of the image sensor to low light levels.

It would therefore be desirable to be able to provide imaging systems with improved dynamic range.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
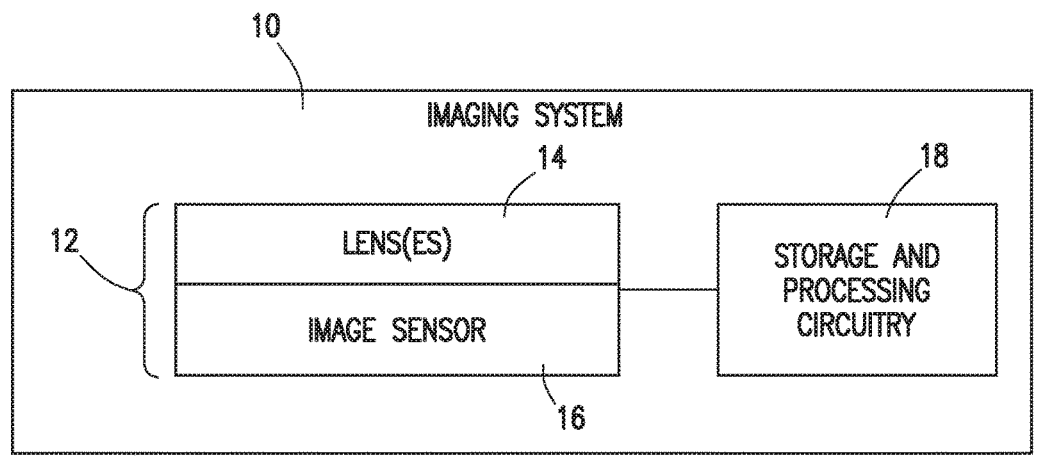
FIG. 1 is a diagram of an illustrative electronic device having an image sensor and processing circuitry for capturing images using a pixel array with multi-port image pixels in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
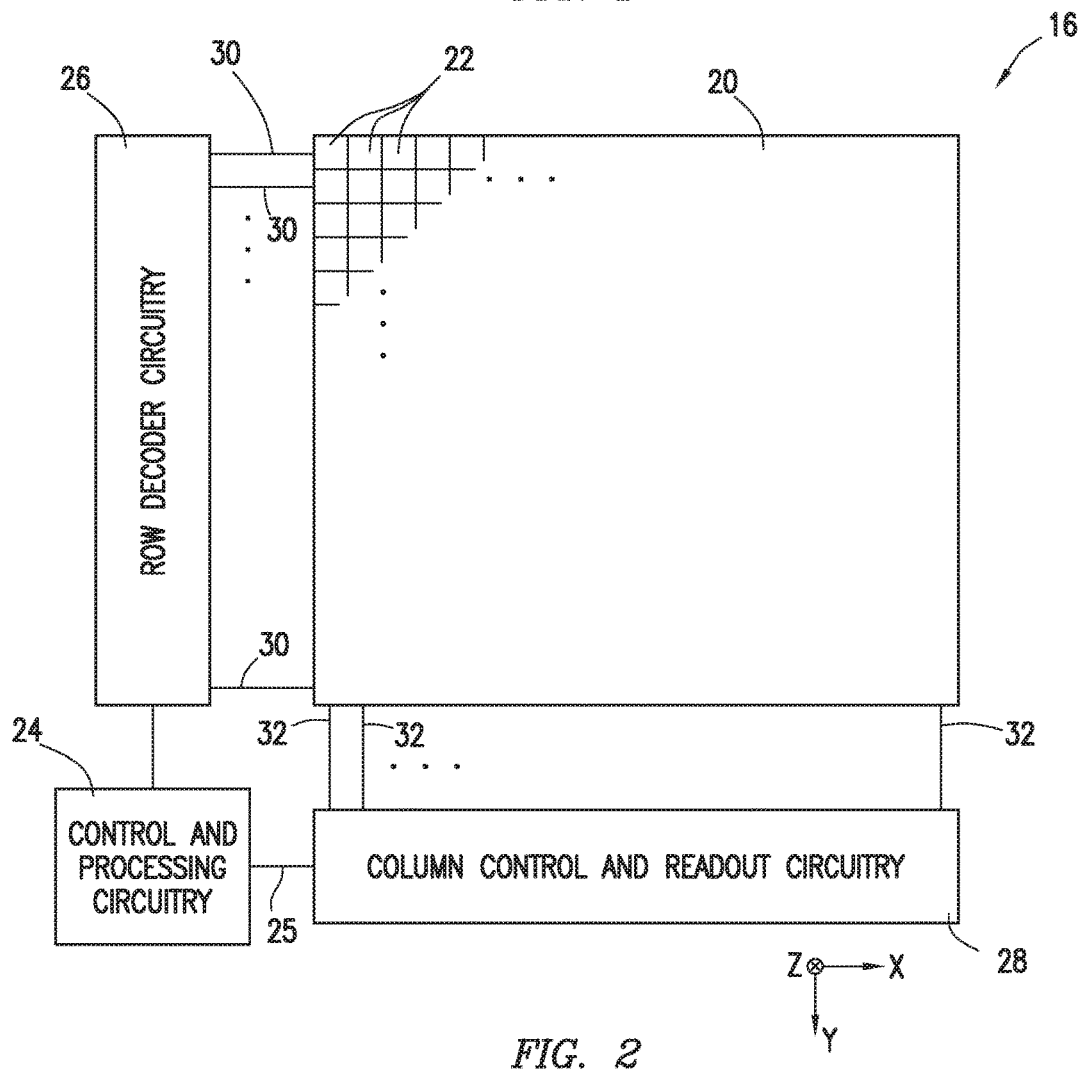
FIG. 2 is a diagram of an illustrative pixel array and associated readout circuitry for reading out image signals from the pixel array in accordance with an embodiment of the present invention.

As shown in FIG. 2, image sensor 16 may include a pixel array 20 containing image sensor pixels 22 arranged in rows and columns (sometimes referred to herein as image pixels or pixels) and control and processing circuitry 24 (which may include, for example, image signal processing circuitry). Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, a color filter array may be formed over photosensitive regions in array 20 so that a desired color filter element in the color filter array is formed over an upper surface of the photosensitive region of an associated pixel 22. A microlens may be formed over an upper surface of the color filter array to focus incoming light onto the photosensitive region associated with that pixel 22. Incoming light may be focused onto the photosensitive region by the microlens and may pass through the color filter element so that only light of a corresponding color is captured at the photosensitive region. If desired, an optional masking layer may be interposed between the color filter element and the microlens for one or more pixels 22 in array 20. In another suitable arrangement, an optional masking layer may be interposed between the color filter element and the photosensitive region for one or more pixels 22 in array 20. The masking layers may include metal masking layers or other filtering layers that block a portion of the image light from being received at the photosensitive region. The masking layers may, for example, be provided to some image pixels 22 to adjust the effective exposure level of corresponding image pixels 22 (e.g., image pixels 22 having masking layers may capture less light relative to image pixels 22 without masking layers). If desired, image pixels 22 may be formed without any masking layers.

If desired, pixels 22 in array 20 of FIG. 2 may be provided with an array of color filter elements that each pass one or more colors of light. All or some of pixels 22 may be provided with a color filter element. Color filter elements for pixels 22 may be red color filter elements (e.g., photoresist material that passes red light while reflecting and/or absorbing other colors of light), blue color filter elements (e.g., photoresist material that passes blue light while reflecting and/or absorbing other colors of light), and/or green color filter elements (e.g., photoresist material that passes green light while reflecting and/or absorbing other colors of light). Color filter elements may also be configured to filter light that is outside the visible human spectrum. For example, color filter elements may be configured to filter ultraviolet or infrared light (e.g., a color filter element may only allow infrared light or ultraviolet light to reach the photodiode). Color filter elements may configure image pixel 22 to only detect light of a certain wavelength or range of wavelengths (sometimes referred to herein as a wavelength band) and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Magenta color filter elements that are configured to pass red and blue light may be also be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels. Image signals generated by broadband image pixels may sometimes be referred to herein as broadband image signals. Broadband image pixels may have a natural sensitivity defined by the material that forms the broadband color filter element and/or the material that forms the image sensor pixel (e.g., silicon). In another suitable arrangement, broadband image pixels may be formed without any color filter elements. The sensitivity of broadband image pixels may, if desired, be adjusted for better color reproduction and/or noise characteristics through use of light absorbers such as pigments. In contrast, "colored" pixel may be used herein to refer to image pixels that are primarily sensitive to one color of light (e.g., red light, blue light, green light, or light of any other suitable color). Colored pixels may sometimes be referred to herein as narrowband image pixels because the colored pixels have a narrower spectral response than the broadband image pixels.

If desired, narrowband pixels and/or broadband pixels that are not configured to be sensitive to infrared light may be provided with color filters incorporating absorbers of NIR radiation. Color filters that block near-infrared light may minimize the impact of infrared light on color reproduction in illuminants containing both visible and infrared radiation.

As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images. In another suitable example, the green pixels in a Bayer pattern are replaced by broadband image pixels having broadband color filter elements. These examples are merely illustrative and, in general, color filter elements of any desired color and in any desired pattern may be formed over any desired number of image pixels 22.

Figure 3:
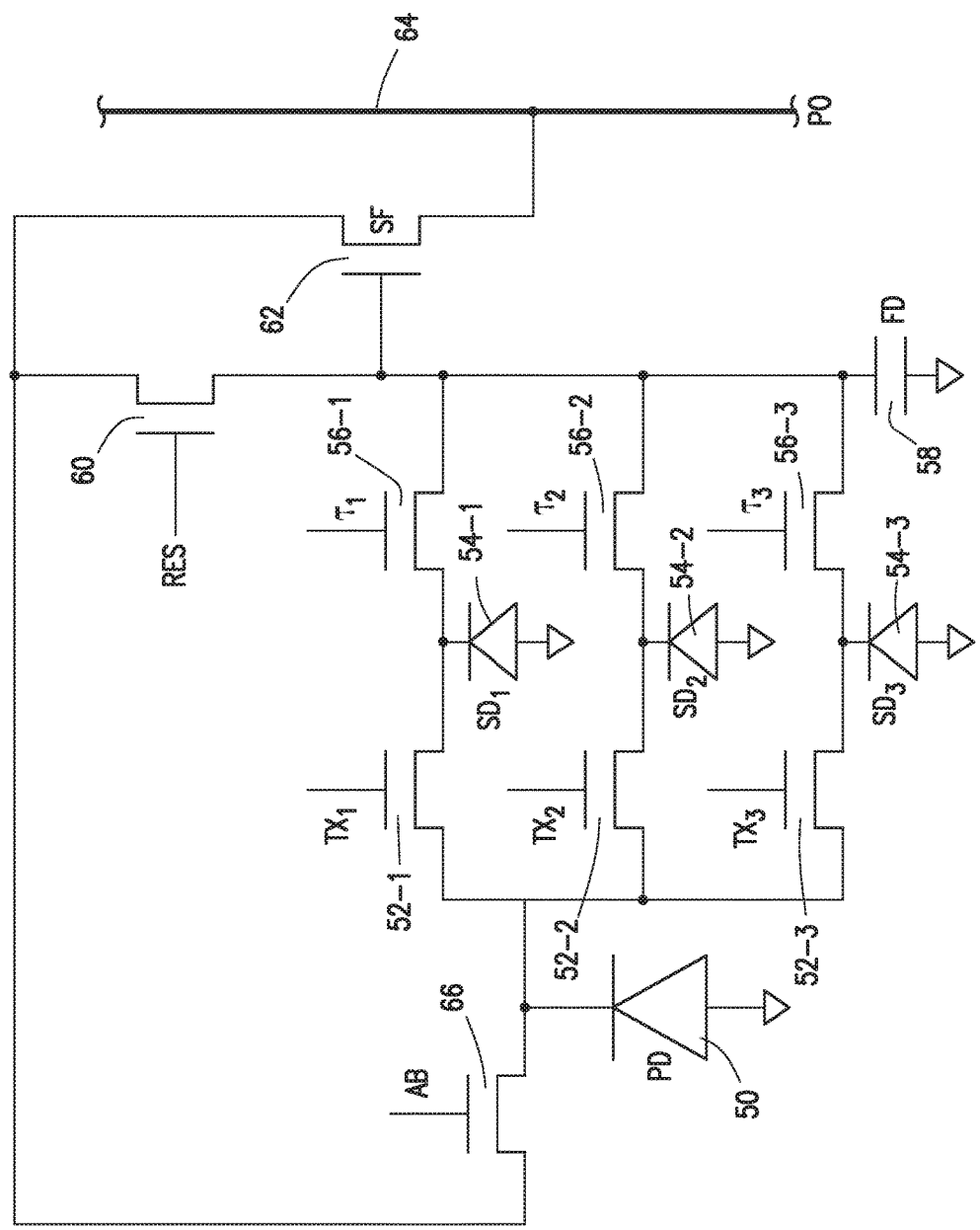
FIG. 3 is a diagram of an illustrative global shutter pixel having multiple access ports in accordance with an embodiment of the present invention.

An illustrative example of circuitry associated with an image sensor pixel 22 (e.g., a global shutter pixel) having multiple access ports is shown in FIG. 3. As described herein, a port may sometimes be referred to as a gate and/or a transistor. As shown in the illustrative example of FIG. 3, an image sensor pixel 22 may include a photodiode (PD) 50. Photodiode 50 may include photosensitive material (e.g., silicon) that generates electrical charge in response to incident photons (e.g., light that is received at the pixel). A plurality of transfer gates (TX), storage diodes (SD), and access port gates ($\tau$) may be coupled to photodiode 50. In the illustrative example of FIG. 3, three transfer gates 52-1 (TX$_1$), 52-2 (TX$_2$), and 52-3 (TX$_3$) are coupled to photodiode 50. Each of the three transfer gates is configured to transfer electrical charge generated by photodiode 50 to one of three respective storage nodes 54-1 (SD$_1$), 54-2 (SD$_2$), and 54-3 (SD$_3$) that are coupled to the transfer gates. Each of the three storage nodes is coupled to a given one of three access ports 56-1 ($\tau_1$), 56-2 ($\tau_2$), and 56-3 ($\tau_3$). Each access port (sometimes referred to herein as output transfer ports, output ports, integration ports, pixel readout ports, output line ports, readout ports and/or readout transfer ports) is configured to transfer charge from the respective storage node to which it is coupled to floating diffusion node (FD) 58. Source follower transistor 62 is coupled to floating diffusion node 58 and is configured to transfer the charge stored on floating diffusion node 58 to pixel output line (PO) 64. Source follower 62 may amplify the signals transferred from floating diffusion node 58. Reset transistor (RES) 60 may be activated to reset floating diffusion node 58 after each respective transfer of charge to source follower 62. If desired, anti-blooming gate AB may reset photodiode 50.

During image capture operations, image pixel circuitry such as that shown in FIG. 3 may be used to output a plurality of image signals generated by photodiode 50 based on different integration times. If desired, reset control signal RES may be asserted before charge generated at photodiode 50 is transferred to floating diffusion node 58 and/or after charge that is stored on floating diffusion node 58 is transferred to pixel output line 64 through source follower 62. Asserting reset control signal RES will turn on reset transistor 60 and reset floating diffusion node 58. If desired, the reset signal RES (e.g., the charge on floating diffusion node 58 during reset operations) may be transferred to source follower transistor 62 and read out on pixel readout line 64. The reset signal may be compared to the pixel signals generated in response to incident light to normalize the pixel signals (in connection with correlated double sampling, for example). De-asserting reset signal RES may turn reset transistor 60 off and allow for image capture operations to begin (e.g., may allow for charge generated at photodiode 50 to be transferred to floating diffusion node 58).

If desired, anti-blooming signal AB may be asserted before and/or after charge is generated at photodiode 50. Asserting anti-blooming signal AB will turn on transistor 66 (e.g., an anti-blooming transistor) and reset photodiode 50. De-asserting anti-blooming signal AB may turn anti-blooming transistor 66 off and allow image capture operations to begin (e.g., allow photodiode 50 to begin generating electrical charges in response to incident light).

An image capture operation may occur during a global integration time (e.g., a frame readout time). The global integration time may be the total amount of time for which photodiode 50 generates electrical charge in response to incident light (e.g., the time allotted for a single exposure). The global integration time may be divided into (e.g., may include) a plurality of shorter integration times. For example, a global integration time may include a first integration time t1, a second integration time t2, and a third integration time t3. A global integration time may include one or more time intervals required to readout pixel signals generated by incident light. If desired, t1 may be shorter than t2, and t2 may be shorter than t3. In one illustrative example, the sum of t1, t2, and t3 is equal to the total global integration time.

A PD 50 may be first reset to a pinning voltage via AB gate 66. A pinning voltage defines the maximum voltage at which the entire photon collection area of the PD 50 is fully depleted, and the PD 50 is at its empty state (i.e., no accumulated charge). During first integration time t1, AB gate and all transfer signals TX$_1$-TX$_3$ are de-asserted, so that PD 50 may start accumulating charge generated in response to incident light. Prior to completion of the integration time t1, storage diode SD$_1$ may be reset to a pinning voltage via reset transistor RES and the $\tau_1$ transistor. The pinning voltage of SD$_1$ may be higher than the pinning voltage of PD to allow complete charge transfer between the PD and SD nodes. After first integration time t1, transfer signal TX$_1$ may be asserted. Asserting transfer signal TX$_1$ may turn on transfer gate transistor 52-1 and allow for electrical charge (electrons) accumulated at photodiode 50 to be transferred to storage node 54-1. The signal TX$_1$ assertion time may be negligible in comparison to charge accumulation time t1. For example, t1 may be 1 micro-second, whereas TX$_1$ assertion time may be 10 nano-seconds. While TX$_1$ is asserted, $\tau_1$ may be de-asserted to allow for accumulated charge in PD 50 to completely transfer to charge storage node SD$_1$ 54-1. At this time, transfer signals TX$_2$ and TX$_3$ (and anti-blooming signal AB, if desired) may be de-asserted while transfer signal TX$_1$ is asserted such that all of the charge generated by photodiode 50 during integration time t1 is transferred to and stored on charge storage node 54-1. After first integration time t1 has elapsed, and after TX$_1$ assertion time (the time required to fully transfer accumulated charge in PD 50 to $SD_1$), transfer signal $TX_1$ may be de-asserted. At that time, the charge generated by photodiode 50 during integration time t1 has accumulated on and is stored at storage node 54-1.

Once first integration time t1 has elapsed (e.g., transfer signal $TX_1$ has been de-asserted), a second integration time t2 may commence for PD 50. It is noted that the charge-transfer after integration time t1 resets the PD 50 to its pinning voltage by design of SD & PD device parameters. During second integration time t2, AB gate and all transfer signals $TX_1$-$TX_3$ are de-asserted, so that PD 50 may start accumulating charge generated in response to incident light. Prior to completion of the integration time t2, storage diode $SD_2$ may be reset to a pinning voltage via reset transistor RES and the $\tau_2$ transistor. The pinning voltage of $SD_2$ is preferably higher than the pinning voltage of PD to allow complete charge transfer between PD and SD nodes. At the end of integration time t2, transfer signal $TX_2$ may be asserted. Asserting transfer signal $TX_2$ may turn on transfer gate transistor 52-2 and allow for electrical charge (electrons) generated at photodiode 50 to be transferred to storage node 54-2. While $TX_2$ is asserted, $\tau_2$ may be de-asserted to allow for charge to accumulate on charge storage node 54-2. At this time, transfer signals $TX_1$ and $TX_3$ (and anti-blooming signal AB, if desired) may be de-asserted while transfer signal $TX_2$ is asserted such that all of the charge generated by photodiode 50 during integration time t2 is transferred to and stored on charge storage node 54-2. After second integration time t2 has elapsed, transfer signal $TX_2$ may be de-asserted. At that time, the charge generated by photodiode 50 during integration time t2 has accumulated on and is stored at storage node 54-2.

Once second integration time t2 has elapsed (e.g., transfer signal $TX_2$ has been de-asserted), a third integration time t3 may commence for PD 50. It is noted that the charge-transfer after integration time t2 resets the PD 50 to its pinning voltage by design of SD & PD device parameters. During third integration time t3, AB gate and all transfer signals $TX_1$-$TX_3$ are de-asserted, so that PD 50 may start accumulating charge generated in response to incident light. Prior to completion of the integration time t3, storage diode $SD_3$ may be reset to a pinning voltage via reset transistor RES and the $\tau_3$ transistor. The pinning voltage of $SD_3$ is preferably higher than the pinning voltage of PD to allow complete charge transfer between PD and SD nodes. At the end of integration time t3, transfer signal $TX_3$ may be asserted. Asserting transfer signal $TX_3$ may turn on transfer gate transistor 52-3 and allow for electrical charge (electrons) generated at photodiode 50 to be transferred to storage node 54-3. While $TX_3$ is asserted, $\tau_3$ may be de-asserted to allow for charge to accumulate on charge storage node 54-3. At this time, transfer signals $TX_1$ and $TX_2$ (and anti-blooming signal AB, if desired) may be de-asserted while transfer signal $TX_3$ is asserted such that all of the charge generated by photodiode 50 during integration time t3 is transferred to and stored on charge storage node 54-3. After third integration time t3 has elapsed, transfer signal $TX_3$ may be de-asserted. At that time, the charge generated by photodiode 50 during integration time t3 has accumulated on and is stored at storage node 54-3. The end of integration time t3 may coincide with the end of a global integration time associated with capturing a single frame. After the global integration time has elapsed, anti-blooming signal AB may be asserted to reset (clear) any charge on photodiode 50.

At the conclusion of a global integration time (e.g., a frame capture), each of storage diodes 54-1, 54-2, and 54-3 may have electrical charge stored thereon. Access port signals (sometimes referred to herein as output transfer signals, output signals, integration signals, pixel readout signals, output line signals, readout signals and/or readout transfer signals) $\tau$ may be asserted to read out the charges stored on the storage diodes onto pixel output line 64. If desired, access port signals $\tau$ may be row-decoded signals (e.g., signals stored on a plurality of charge storage nodes $SD_1$ in a common row of image pixels may be read out at the same time, signals stored on a plurality of charge storage nodes $SD_2$ in a common row of image pixels may be read out at the same time, etc.).

A readout operation may commence after electrical charge is stored in any one set of storage diodes 54-1, 54-2 or 54-3. The readout operation need not wait until all of the storage diodes have electrical charge stored. During readout operations (which may be a part of image capture operations described above), access port signal $\tau_1$ may be asserted. Access port signal $\tau_1$ may be a common signal across all pixels in a given row. In one suitable example, accessing access port 56-1 is a row-by-row operation for the image array. Prior to assertion of access port signal $\tau_1$, floating diffusion node 58 is reset to a supply voltage level via reset gate 60. This reset voltage level drives the source-follower SF 62 output onto column line PO 64 to a voltage level that is linearly related to the SF gate node (i.e., floating diffusion node 58) voltage. This first PO voltage level is stored for correlated double sampling (CDS), and may be a common operation for all readout conditions. Asserting access port signal $\tau_1$ may activate access port transistor 56-1 and transfer charge from storage node ($SD_1$) 54-1 to floating diffusion node 58. Activating access port transistor 56-1 may transfer all charge stored on storage node 54-1 to floating diffusion node 58, effectively resetting storage node 54-1. Assertion of access port signal $\tau_1$ may occur simultaneously or overlap the charge accumulation in photodiode 50 for the t2 and t3 integrations times. Assertion of access port $\tau_1$ may occur simultaneously or overlap the charge transfer from photodiode 50 to either storage diode 54-2 ($SD_2$) or 54-3 ($SD_3$) after charge integration times t2 or t3, respectively. The transferred charge from SD1 54-1 to FD node 58 may lower the FD node 58 voltage by an amount proportional to the transferred charge, which in turn drives the output PO 64 to a linearly related lower voltage level. This second PO voltage level is also stored for correlated double sampling, and the difference in PO voltages is taken as the noise-corrected PD signal. Column readout circuitry (e.g., column control and readout circuitry 28) may assert readout signals on a pixel output line 64 that is driven by a voltage level on floating diffusion node 58 via SF 62. Source follower transistor 62 may amplify the signal from floating diffusion node 58. The source follower 62 output voltage generated by charge transferred to floating diffusion node 58 may be read out on output line 64 to column control and readout circuitry 28 and used to generate image data (e.g., digital image data). As mentioned before, reset signal RES may be asserted before access port signal $\tau_1$ is asserted to clear any charge from floating diffusion node 58. The reset signal may be read out on pixel output line 64 (through source-follower transistor 62, for example) to column control and readout circuitry 28 for correlated double sampling (CDS) and/or other image processing operations.

Access port signal $\tau_2$ may also be asserted during read out operations (before or after access port signal $\tau_1$ is asserted, for example). Access port $\tau_2$ may be a common signal for all the pixels in a given row. In one example, accessing access port $\tau_2$ is a row-by-row operation for the image array. Asserting access port signal $\tau_2$ may activate access port transistor 56-2 and transfer charge from storage node (SD$_2$) 54-2 to floating diffusion node 58. Activating access port transistor 56-2 may transfer all charge stored on storage node 54-2 to floating diffusion node 58, effectively resetting storage node 54-2. Assertion of access port signal $\tau_2$ may occur simultaneously or overlap the charge accumulation in photodiode 50 for the t1 and t3 integrations times. Assertion of access port $\tau_2$ may occur simultaneously or overlap the charge transfer from photodiode 50 to either storage diode 54-1 (SD$_1$) or 54-3 (SD$_3$) after charge integration times t1 or t3 respectively. The transferred charge from SD$_2$ 54-2 to FD may provide the PD charge signal for CDS. Column readout circuitry (e.g., column control and readout circuitry 28) may assert a readout signal on pixel output line 64 due to transfer charge on floating diffusion node 58. The readout signal may be generated from charge on floating diffusion node 58 and coupled onto pixel output line 64 via source-follower transistor 62. Source follower transistor 62 may amplify the signal from floating diffusion node 58. The charge transferred to floating diffusion node 58 may be read out on output line 64 to column control and readout circuitry 28 and used to generate image data (e.g., digital image data). If desired, reset signal RES may be asserted before access port signal $\tau_2$ is asserted to clear any charge from floating diffusion node 58. The reset signal may be read out on pixel output line 64 (through source-follower transistor 62, for example) to column control and readout circuitry 28 for correlated double sampling (CDS) and/or other image processing operations.

Access port signal $\tau_3$ may also be asserted during read out operations (before or after access port signals $\tau_1$ and $\tau_2$ are asserted, for example). Access port $\tau_3$ may be a common signal for all the pixels in a given row. In one suitable arrangement, accessing access port $\tau_3$ is a row-by-row operation for the image array. Asserting access port signal $\tau_3$ may activate access port transistor 56-3 and transfer charge from storage node (SD$_3$) 54-3 to floating diffusion node 58. Activating access port transistor 56-3 may transfer all charge stored on storage node 54-3 to floating diffusion node 58, effectively resetting storage node 54-3. Assertion of access port $\tau_3$ may occur simultaneously or overlap the charge accumulation in photodiode 50 for the t1 and t2 integrations times. Assertion of access port $\tau_3$ may occur simultaneously or overlap the charge transfer from photodiode 50 to either storage diode 54-1 (SD$_1$) or 54-2 (SD$_2$) after charge integration times t1 or t2, respectively. The transferred charge from SD$_3$ 54-3 to floating diffusion node 58 may provide the PD charge signal for CDS. Column readout circuitry (e.g., column control and readout circuitry 28) may assert a readout signal on pixel output line 64 due to transfer charge on floating diffusion node 58. The readout signal may be generated from charge on floating diffusion node 58 and coupled onto pixel output line 64 via source-follower transistor 62. Source follower transistor 62 may amplify the signal from floating diffusion node 58. The charge transferred to floating diffusion node 58 may be read out on output line 64 to column control and readout circuitry 28 and used to generate image data (e.g., digital image data). If desired, reset signal RES may be asserted before access port signal $\tau_3$ is asserted to clear any charge from floating diffusion node 58. The reset signal may be read out on pixel output line 64 (through source-follower transistor 62, for example) to column control and readout circuitry 28 for correlated double sampling (CDS) and/or other image processing operations.

In global-shutter pixel arrangements, for all pixels 22 in pixel array 20 of FIG. 2, the plurality of TX$_1$ gates may receive a common first TX signal, the plurality of TX$_2$ gates may receive a common second TX signal, and the plurality of TX$_3$ gates may receive a common third TX signal. The entire array of pixels may integrate charge for the first integration time t1, and transfer each individual PD charge to respective SD$_1$ storage nodes via global first TX signal simultaneously. Similarly, the entire array of pixels may integrate charge for the second integration time t2, and transfer each individual PD charge to respective SD$_2$ storage nodes via global second TX signal simultaneously. Finally, the entire array of pixels may integrate charge for the third integration time t3, and transfer each individual PD charge to respective SD$_3$ storage nodes via global third TX signal simultaneously. When the entire frame-integration is complete, incident light in each pixel for three different integration times are captured and saved in corresponding storage diodes. This is a triplicate "temporal" image that allows for enhancing image resolution. A very low-light pixel is best evaluated under the longest integration time t3, while a very bright-light pixel is best evaluated under the shortest integration time t1. This is due to the limited saturation full-well capacity of the given photo-diode (PD 50) that limits the maximum charge that can be stored by the pixel. For very bright incident light, the PD fills quickly, and the short integration time captures a full-well signal. Any time thereafter creates a charge overflow in the PD that does not contribute to the image signal. For very low incident light, the PD fills very slowly, and a long integration time is needed to capture a valid signal. A shorter time does not provide an adequate PD signal. If desired, only one of the three temporal values may be kept as the true signal for the final image. A selection algorithm (using the saturation full well capacity as a measure) may decide which of the three stored SD values at a given pixel location is carried to the final image from the saved temporal data. For example, by selecting the first, second, and third integration times such that t3:t2:t1=100:10:1, the dynamic range can be increased by one hundred times over a single integration time image. A multi-port pixel array may include any number of integration time intervals as desired to increase the dynamic range by, for example, one thousand times, ten thousand times, or more.

A global-shutter image array may be used to capture a still-image, in which case only a single frame picture is required. A global-shutter image array may capture streaming video images, in which case twenty, thirty, sixty, or more frames may be generated in one second (e.g., 30 fps or 60 fps video). In all cases, the shortest single frame capture time has the least motion blur, and facilitates the highest streaming rate for video.

Although the examples above are described in connection with three transfer gates, storage diodes, and access ports, this is merely illustrative. In general, multi-port pixels may include any suitable number of transfer gates, storage nodes, and access ports to generate any suitable number of signals using any suitable integration times. If desired, image signals generated during a first integration time may be read out (on pixel output line 64, for example), during a subsequent integration time (e.g., readout operations for one storage node may occur during an integration period for another storage node coupled to the same photodiode).

While the examples described above in connection with FIG. 3 are described in connection with global shutter image capture operations (e.g., each image captured is an image of a single point in time based on image data from the entire array 20 of pixels 22.), this is merely illustrative. Image pixels 22 of the type shown and described in connection with FIG. 3 may be used in connection with any suitable image capture operations.

Figure 4:
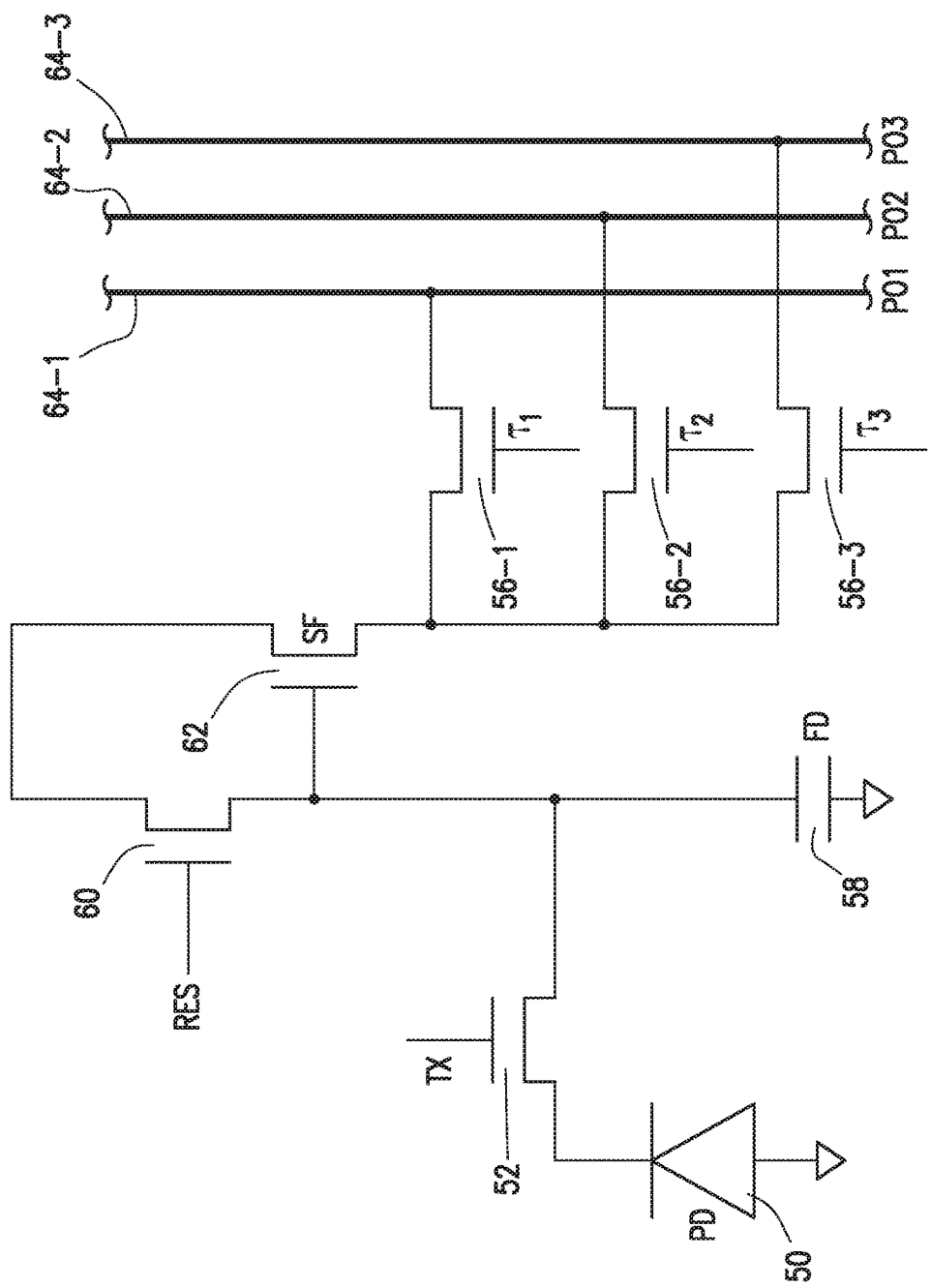
FIG. 4 is a diagram of an illustrative rolling shutter pixel having multiple access ports in accordance with an embodiment of the present invention.

An illustrative example of circuitry associated with an image sensor pixel 22 (e.g., a rolling shutter pixel) having multiple access ports is shown in FIG. 4. As described above in connection with FIG. 3, a pixel 22 of the type shown in FIG. 4 may include a photodiode (PD) 50 that includes photosensitive material such as silicon that generates charge in response to incident photons. A transfer gate 52 (TX) may be coupled to photodiode 50. Transfer gate 52 may be a transistor that is configured to transfer electrical charge generated by photodiode 50 to floating diffusion node (FD) 58. Floating diffusion node 58 may be coupled to reset transistor (RES) 60 and source follower transistor (SF) 62. During image capture operations, charge may be transferred from photodiode 50 to floating diffusion (FD) node 58 via transfer gate 52. The FD node is initially at a reset voltage level, set via the reset transistor 60. This reset voltage level generates a source follower output voltage that can be read out through any one of pixel output lines (PO) 64 through source-follower (SF) transistor 62. The transferred charge from the PD node to the FD node modifies the voltage level in the FD node, which in turn modifies the output voltage on the one or more PO lines driven by the SF transistor. Reset transistor 60 may be configured to reset floating diffusion node 58 at various points during image capture operations. For example, reset transistor 60 may reset floating diffusion node 58 before charge is transferred to floating diffusion node 58 from photodiode 50 and/or reset transistor 60 may reset floating diffusion node 58 after charge is transferred from floating diffusion node 58 to pixel output lines 64 through source follower 62. If desired, reset signals from reset transistor 60 may be coupled to one or more pixel output lines 64 and read out from image pixel 22 in accordance with correlated double sampling (CDS) or other image capture operations. The reset signal may refer to the voltage (charge level) at the FD node after a reset operation that defines a reference voltage level.

Charge generated by photodiode 50 and stored on floating diffusion node 58 modulates the reset signal level at the floating diffusion node. This may be termed an FD signal, the level of which is equal to or lower than the FD reset signal for N-type junction FD diodes. (If desired, the FD signal may be equal to or greater than the reset signal for P-type junction FD diodes). This FD signal may be coupled to pixel output lines 64 through source follower 62. In accordance with an embodiment of the present invention, an image pixel 22 may be provided with a plurality of access ports τ (sometimes referred to herein as output transfer ports, output ports, integration ports, pixel readout ports, output line ports, readout ports and/or readout transfer ports) that route electrical signals that are transferred through source follower 62 to one of the pixel output lines 64. As described herein, a port may sometimes be referred to as a gate and/or a transistor. In the illustrative example of FIG. 4, image pixel 22 is provided with three access ports τ. Access port 56-1 ($\tau_1$) may be coupled to a first pixel output line 64-1 (PO1), access port 56-2 ($\tau_2$) may be coupled to a second pixel output line 64-2 (PO2), and access port 56-3 ($\tau_3$) may be coupled to a third pixel output line 64-3 (PO3). In one embodiment, the access port signals $\tau_1$ (as well as $\tau_2$ and $\tau_3$, if desired) may be a common row-signal for pixels 22 in array 20 of FIG. 2 in the row direction. This facilitates row-by-row evaluation of pixel readout. Access ports 56-1, 56-2, and 56-3 may couple a floating diffusion node signal to pixel output lines 64-1, 64-2, and 64-3 in accordance with a first integration time t1, a second integration time t2, and a third integration time t3, respectively. For example, access port 56-1 may receive a first access port signal $\tau_1$ that corresponds to a first integration time. First access port signal $\tau_1$ may turn on access port transistor 56-1 to read the FD signal from a first period of time. PD charge that is transferred to floating diffusion node 58 generates an FD voltage that modulates a first source follower 62 output voltage that is coupled onto pixel output line 64-1 through access port 56-1. Similarly, access port 56-2 may receive a second access port signal $\tau_2$ that corresponds to a second integration time. Second access port signal $\tau_2$ may turn on access port transistor 56-2 for a second period of time during which charge that is transferred to floating diffusion node 58 generates a floating diffusion node voltage that modulates a source follower 62 output voltage that is coupled onto pixel output line 64-2 through access port 56-2. Access port 56-3 may receive a third access port signal $\tau_3$ that corresponds to a third integration time. Third access port signal $\tau_3$ may turn on access port transistor 56-3 for a third period of time during which charge that is transferred to floating diffusion node 58 generates a floating diffusion node voltage that modulates a source follower 62 output voltage that is coupled onto pixel output line 64-3 through access port 56-3. The source follower output voltage that is coupled onto pixel output lines 64-1, 64-2, and/or 64-3 may be read out by pixel control and readout circuitry 28.

If desired, reset control signal RES may be asserted before charge generated at photodiode 50 is transferred to floating diffusion node 58 and/or after charge that is transferred to floating diffusion node 58 is coupled to pixel output line 64 through source follower 62. Asserting reset control signal RES will turn on reset transistor 60 and reset floating diffusion node 58 to a reset voltage level. If desired, the reset signal RES (e.g., the charge on floating diffusion node 58 during reset operations, or the voltage level on the floating diffusion node after the reset operation) may be coupled to source follower transistor 62 and the source follower output may be read out on pixel readout line 64. The reset signal may be compared to the pixel signals generated in response to incident light to normalize the pixel signals (in connection with correlated double sampling, for example). De-asserting reset signal RES may turn reset transistor 60 off and allow for image capture operations to begin (e.g., may allow for charges generated at photodiode 50 to be transferred to floating diffusion node 58).

During image capture operations, image pixel circuitry (such as that shown in FIG. 4) associated with an image pixel 22 may be used to generate and output an image signal associated with one or more of a plurality of integration times. (e.g., the amount of time allotted for the capture of one frame). A first image pixel 22 having circuitry of the type shown in FIG. 4 may generate charge that is coupled to and read out on a pixel output line 64 for part or all of the total integration time for a given frame. For example, pixel circuitry of the type shown in FIG. 4 may be configured to generate and couple charge to first pixel output line 64-1 in accordance with a first integration time t1. In such an example, image capture operations may begin after floating diffusion node 58 has been cleared by a reset signal from reset transistor 60. At that time, reset signal RES may be de-asserted and photodiode 50 may begin generating charge in response to incident photons (e.g., photodiode 50 may generate charge for the duration of first integration time t1). After first integration time t1 has elapsed, transfer signal TX may be asserted to turn on transfer gate 52. Turning on transfer gate TX allows charge generated by photodiode 50 to be transferred to floating diffusion node 58. Turning on transfer gate TX may transfer all of the charge generated by photodiode 50 to floating diffusion node 58, effectively resetting the photodiode 50. The charge generated by the PD, when transferred to the FD node, modulates the total charge at the FD node from the original reset level. This modulated charge may sometimes be referred herein as FD charge, floating diffusion charge, or floating diffusion node charge. Transfer signal TX may then be de-asserted to turn transfer gate TX off, and pixel control and readout circuitry 28 (or other suitable control circuitry) may assert signals to stabilize the charge on floating diffusion node 58 that is coupled to source follower 62. Source follower 62 may couple the FD charge to one of pixel output lines 64. In one illustrative example, pixel circuitry of the type shown in FIG. 4 is used to generate and couple PD charge to pixel output lines. Access port signals (sometimes referred to herein as output transfer signals, output signals, integration signals, pixel readout signals, output line signals, readout signals and/or readout transfer signals) may be asserted to couple transferred PD charge on floating diffusion node 58 to pixel output lines. In one suitable example in which a first photodiode (PD1) charge is coupled to first pixel output line 64-1 in accordance with a first integration time t1, access port signal $\tau_1$ may be asserted and access port 56-1 may be turned on such that FD charge coupled through source follower 62 is further coupled to pixel output line 64-1. In such an example, access port signal $\tau_1$ may be asserted while access port signals $\tau_2$ and $\tau_3$ may be de-asserted and access ports 56-2 and 56-3 may be turned off such that all charge generated by photodiode 50 during first integration time t1 is coupled onto and read out from pixel output line 64-1.

In accordance with an embodiment of the present invention, a second image pixel 22 having pixel circuitry of the type shown in FIG. 4 may be configured to generate and couple a second photodiode (PD2) charge to second pixel output line 64-2 in accordance with a second integration time t2. If desired, the first pixel and the second pixel may be formed in the same column of image pixel array 20. In such an example, image capture operations may begin after floating diffusion node 58 has been cleared by a reset signal from reset transistor 60. At that time, reset signal RES may be de-asserted and photodiode 50 may begin generating charge in response to incident photons (e.g., photodiode 50 may generate charge for the duration of second integration time t2). After second integration time t2 has elapsed, transfer signal TX may be asserted to turn on transfer gate 52. Turning on transfer gate TX allows charge generated by photodiode 50 to be transferred to floating diffusion node 58. Turning on transfer gate TX may transfer all of the charge generated by photodiode 50 to floating diffusion node 58, effectively resetting the photodiode 50. Transfer signal TX may then be de-asserted to turn transfer gate TX off, and pixel control and readout circuitry 28 (or other suitable control circuitry) may assert signals to stabilize the charge that is on floating diffusion node 58 and coupled to source follower 62. Source follower 62 may couple the floating diffusion node charge to one of pixel output lines 64. In the illustrative example in which pixel circuitry of the type shown in FIG. 4 is used to generate and couple FD charge to second pixel output line 64-2 in accordance with a second integration time t2, access port signal $\tau_2$ may be asserted and access port 56-2 may be turned on such that FD charge coupled to source follower 62 is further coupled to pixel output line 64-2. In such an example, access port signal $\tau_2$ may be asserted while access port signals $\tau_1$ and $\tau_3$ may be de-asserted and access ports 56-1 and 56-3 may be turned off such that all charge generated by photodiode 50 during second integration time t2 is coupled onto and read out from pixel output line 64-2.

In accordance with an embodiment of the present invention, a third image pixel 22 having pixel circuitry of the type shown in FIG. 4 may be configured to generate and couple a third photodiode (PD3) charge to third pixel output line 64-3 in accordance with a third integration time t3. If desired, the first pixel, the second pixel, and the third pixel may be formed in the same column of image pixel array 20. In such an example, image capture operations may begin after floating diffusion node 58 has been cleared by a reset signal from reset transistor 60. At that time, reset signal RES may be de-asserted and photodiode 50 may begin generating charge in response to incident photons (e.g., photodiode 50 may generate charge for the duration of third integration time t3). After third integration time t3 has elapsed, transfer signal TX may be asserted to turn on transfer gate 52. Turning on transfer gate TX allows charge generated by photodiode 50 to be transferred to floating diffusion node 58. Turning on transfer gate TX may transfer all of the charge generated by photodiode 50 to floating diffusion node 58, effectively resetting the photodiode 50. Transfer signal TX may then be de-asserted to turn transfer gate TX off, and pixel control and readout circuitry 28 (or other suitable control circuitry) may assert signals to stabilize charge on floating diffusion node 58 that is coupled to source follower 62. Source follower 62 may couple the FD charge to one of the pixel output lines 64. In the illustrative example in which pixel circuitry of the type shown in FIG. 4 is used to generate and couple FD charge to third pixel output line 64-3 in accordance with a third integration time t3, access port signal $\tau_3$ may be asserted and access port 56-3 may be turned on such that FD charge coupled to source follower 62 is further coupled to pixel output line 64-3. In such an example, access port signal $\tau_3$ may be asserted while access port signals $\tau_1$ and $\tau_2$ may be de-asserted and access ports 56-1 and 56-2 may be turned off such that all charge generated by photodiode 50 during third integration time t3 is coupled onto and read out from pixel output line 64-3. Charge that is coupled onto pixel output lines 64-1, 64-2, and/or 64-3 may be read out by pixel control and readout circuitry 28 and used to generate an image (e.g., a digital image and/or a high dynamic range image).

In one suitable example, each of the first, second, and third photodiodes described above may begin generating charge at the same time (e.g., the first, second, and third integration times may each begin at the same point in time). This, however, is merely illustrative. If desired, one or more of the various integration times may begin at staggered start times such that the integration times have a partial or no overlap. In one suitable arrangement, the first, second, and third photodiodes may begin generating charge at different times, but may be configured such that the first, second, and third integration times end simultaneously. In large arrays having multiple rows of pixels, any staggered multiple integration time scheme may have overlapping starting and ending times for different pixels. If desired, first integration time t1 may be less than the second integration time t2, and second integration time t2 may be less than third integration time t3. If desired, t1 may be greater than t2, and t3 may be greater than t2. In one suitable example, the sum of t1, t2, and t3 is equal to the total integration time allotted for capturing a single image frame. In another suitable example, the sum of t1, t2, and t3 is less than the total integration time allotted for capturing a single frame. In such an example, there is a delay-time before the next frame of data is generated (e.g., the minimum time required to read-out all the pixel output signals three times is determined by the column read-out cycle time, which may exceed the sum of integration times t1, t2, and t3). In yet another example, the third integration time is so much larger than the first and second integration times, it determines the frame-rate of the imaging system (e.g., during t3 integration, all of the t1 and t2 integrations, photodiode to floating diffusion charge transfer & pixel output signal read out operations for t1 & t2 are completed).

If desired, a photodiode 50 in a given one of the first, second and/or third pixels described above (in different rows, if desired) may begin generating & accumulating charge in accordance with a second integration time t2 immediately after charge generated during first integration time t1 has been transferred to floating diffusion node 58 (e.g., after the photodiode 50 has been reset). For example, after charge generated by photodiode 50 during first integration time t1 is transferred to floating diffusion node 58, photodiode 50 may immediately start generating and accumulating charge again for a second integration time t2. In a row-by-row readout operation, a plurality of PD rows may be undergoing t1 integration phase, and a plurality of PD rows may be undergoing t3 integration phase, when a specific PD row may complete t2 integration phase and enter the readout phase. Similarly, after charge generated by photodiode 50 during second integration time t2 is transferred to floating diffusion node 58, photodiode 50 may immediately start generating charge again for a third integration time t3. In this way, a given photodiode 50 may generate three separate signals with no delays in between charge integration time intervals during a single total integration time (e.g., the amount of integration time allotted to capture a single image frame). If desired, a given photodiode may begin generating charge for a third integration time t3 immediately after charge generated during a second integration time t2 has been transferred to floating diffusion node 58, and/or a given photodiode may begin generating charge for a first integration time t1 immediately after charge generated during a third integration time t3 has been transferred to floating diffusion node 58.

Because the given column of pixel array 20 in which the first, second, and third image pixels are formed is provided with both first, second, and third pixel output lines 64-1, 64-2, and 64-3, first, second, and third image signals may be simultaneously generated by first, second, and third image pixels that are exposed for first, second, and third integration times. Simultaneously generating first, second, and third image signals from first, second, and third image pixels in a given column may be advantageous for high dynamic range (HDR) image capture operations. In a row-by-row readout scheme, a first row may generate first integration signals, a second row may generate second integration signals, and a third row may generate third integration signals in all columns simultaneously. In contrast with conventional HDR image capture operations in which only one image signal may be read out from a given column at once (resulting in each image signal of a different integration time being read out a different time, which may introduce undesirable image artifacts as well as delay-times to sequence the required integration time intervals with readout time), image signals generated using different integration times in connection with image pixel circuitry of the type shown in FIG. 4 may be generated simultaneously and therefore have reduced or no temporal artifacts and higher frame-rates.

If desired, access port signals τ asserted at access ports 56 may be row-decoded. For example, a plurality of pixels in a first row of image pixels in array 20 may each simultaneously receive access port signal $\tau_1$ during an image capture operation and may each simultaneously transfer image signals corresponding to a first integration time t1 onto a respective pixel output line 64-1. During the image capture operation, a plurality of pixels in a second row of image pixels in array 20 may each simultaneously receive access port signal $\tau_2$ and may each simultaneously transfer image signals corresponding to a second integration time t2 onto a respective pixel output line 64-2. Similarly, a plurality of pixels in a third row of image pixels in array 20 may simultaneously receive access port signal $\tau_3$ and may each simultaneously transfer image signals corresponding to a third integration time t3 onto a respective pixel output line 64-3. Because each of the first, second, and third image signals generated in a given column is read out on a separate pixel readout line 64, each of the image signals can be simultaneously generated and read out. In this way, image signals from different pixels in a given column may be simultaneously generated using different integration times.

In accordance with an embodiment of the present invention, access port signals τ may be asserted in a serial, row-by-row manner in a pixel array 20. For example, access port signal $\tau_1$ may be asserted for a first row in array 20 at a given time. After access port signal $\tau_1$ has been asserted for the first row (e.g., after all of the pixels in the first row have read out the charges generated during a first integration time on respective first output lines 64-1), access port signal $\tau_1$ may be asserted for a second row in array 20. In this way, access port signal $\tau_1$ may be asserted at each row in array 20 such that a signal generated during a first integration time t1 for each pixel in array 20 may be read out. Similarly, access port signals $\tau_2$ and $\tau_3$ may be serially asserted at each pixel 22 in pixel array 20. Because each of access port signals $\tau_1$, $\tau_2$, and $\tau_3$ transfers charge onto a different pixel output line 64, a first charge generated by a first pixel in a given row and a given column of array 20 may be read out at a given time, and a second charge generated by a second pixel in another given row and the given column of array 20 may be read out at the same given time (e.g., during a situation in which, because of the different integration times that are used, access port signals τ happen to be applied to two pixels in the same column at the same time). In this way, charges based on different integration times from multiple different pixels in a given column may be read out simultaneously.

While the examples described above in connection with FIG. 4 are described in connection with rolling shutter image capture operations (e.g., each image is captured on a row-by-row basis), this is merely illustrative. Image pixels 22 of the type shown and described in connection with FIG. 4 may be used in connection with any suitable image capture operations. In general, image pixel circuitry of the type shown and described in connection with FIG. 4 may allow for increased readout speed during sequential multi-exposure high dynamic range image capture operations.

Figure 5:
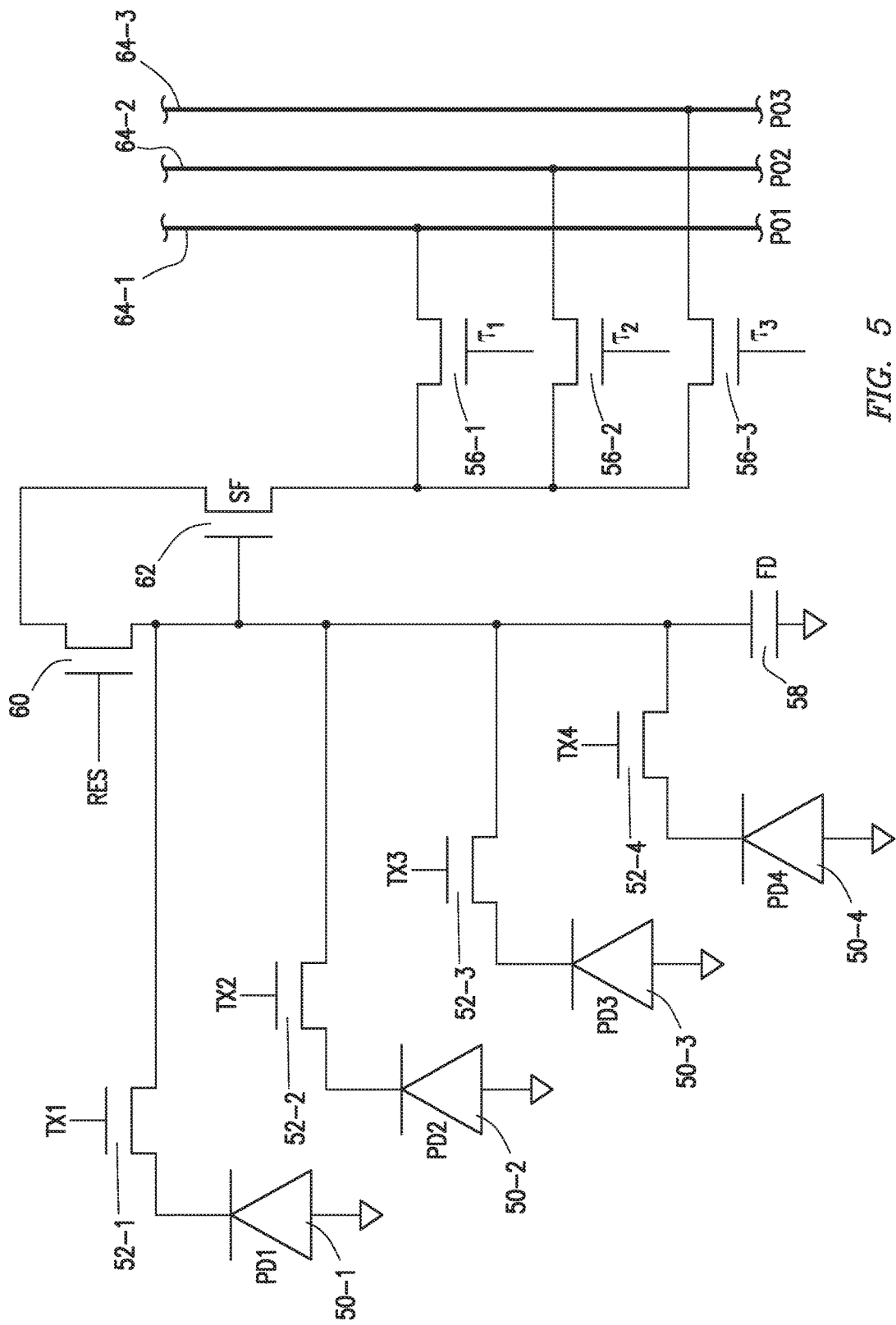
FIG. 5 is a diagram of an illustrative rolling shutter pixel having multiple access ports and multiple photodiodes that share a common floating diffusion node in accordance with an embodiment of the present invention.

An illustrative example of circuitry associated with an image sensor pixel 22 (e.g., a rolling shutter pixel) having multiple access ports and a plurality of photodiodes that share a common floating diffusion node is shown in FIG. 5. A pixel 22 of the type shown in FIG. 5 may include a plurality of photodiodes (PD) 50-1, 50-2, 50-3, and 50-4 that include photosensitive material such as silicon that generates charge in response to incident photons. Respective transfer gates (TX) 52-1, 52-2, 52-3, 52-4 may be coupled to photodiode 50. Transfer gates 52 may be transistors that are configured to transfer electrical charge generated by photodiodes 50 to a shared floating diffusion node (FD) 58. Shared floating diffusion node 58 may be coupled to reset transistor (RES) 60 and source follower transistor (SF) 62. During image capture operations, charge may be transferred from shared floating diffusion node 58 to pixel output lines (PO) 64 through source follower transistor 62. Reset transistor 60 may be configured to reset shared floating diffusion node 58 at various points during image capture operations. For example, reset transistor 60 may reset shared floating diffusion node 58 before charge is transferred to shared floating diffusion node 58 from photodiode 50 and/or reset transistor 60 may reset shared floating diffusion node 58 after charge is transferred from shared floating diffusion node 58 to pixel output lines 64 through source follower 62. If desired, reset signals from reset transistor 60 may be coupled to one or more pixel output lines 64 and read out from image pixel 22 in accordance with correlated double sampling (CDS) or other image capture operations.

Charge generated by each of photodiodes 50-1, 50-2, 50-3, and 50-4 and stored on floating diffusion node 58 may be coupled to pixel output lines 64 through source follower 62. In accordance with an embodiment of the present invention, an image pixel 22 may be provided with a plurality of access ports τ that route electrical signals that are transferred through source follower 62 to one of the pixel output lines 64. In the illustrative example of FIG. 5, image pixel 22 is provided with three access ports τ. Access port 56-1 ($\tau_1$) may be coupled to a first pixel output line 64-1 (PO1), access port 56-2 ($\tau_2$) may be coupled to a second pixel output line 64-2 (PO2), and access port 56-3 ($\tau_3$) may be coupled to a third pixel output line 64-3 (PO3). Access ports 56-1, 56-2, and 56-3 may couple source follower 62 output to pixel output lines 64-1, 64-2, and 64-3 in accordance with a first integration time t1, a second integration time t2, and a third integration time t3, respectively. For example, access port 56-1 may receive a first access port signal $\tau_1$ that corresponds to a first integration time. First integration signal $\tau_1$ may turn on access port transistor 56-1 for a first period of time during which charge on floating diffusion node 58 drives the source follower 62 output and is coupled onto pixel output line 64-1 through access port 56-1. Similarly, access port 56-2 may receive a first access port signal $\tau_2$ that corresponds to a second integration time. Second access port signal $\tau_2$ may turn on access port transistor 56-2 for a second period of time during which charge on floating diffusion node 58 drives source follower 62 output and is coupled onto pixel output line 64-2 through access port 56-2. Access port 56-3 may receive a third access port signal $\tau_3$ that corresponds to a third integration time. Third integration signal $\tau_3$ may turn on access port transistor 56-3 for a third period of time during which charge on floating diffusion node 58 drives source follower 62 output and is coupled onto pixel output line 64-3 through access port 56-3. SF output signal that is coupled onto pixel output lines 64-1, 64-2, and/or 64-3 may be read out by pixel control and readout circuitry 28 and used to generate an image (e.g., a digital image and/or a high dynamic range image).

During image capture operations, image pixel circuitry (such as that shown in FIG. 5) associated with an image pixel 22 may be used to generate and output an image signal associated with one or more of a plurality of integration times. For example, reset control signal RES may be asserted before charge generated at one of photodiodes 50-1, 50-2, 50-3, and 50-4 is transferred to shared floating diffusion node 58 and/or after charge that is stored on shared floating diffusion node 58 is coupled to pixel output line 64 through source follower 62. Asserting reset control signal RES will turn on reset transistor 60 and reset shared floating diffusion node 58. If desired, the reset signal RES (e.g., the charge on floating diffusion node 58 during reset operations) may be coupled to source follower transistor 62 and read out on pixel readout line 64. The reset signal may be compared to the pixel signals generated in response to incident light to normalize the pixel signals (in connection with correlated double sampling, for example). De-asserting reset signal RES may turn reset transistor 60 off and allow for image capture operations to begin (e.g., may allow for charges generated at charge generated at one of photodiodes 50-1, 50-2, 50-3, and 50-4 to be transferred to shared floating diffusion node 58).

Image capture operations may occur during an integration time (e.g., the amount of time allotted for the capture of one frame). An image pixel 22 having circuitry of the type shown in FIG. 5 may generate charge that is coupled to and read out on a pixel output line 64 for part or all of the total integration time for a given frame. For example, pixel circuitry of the type shown in FIG. 5 may be configured to generate and couple charge to first pixel output line 64-1 in accordance with a first integration time t1. In such an example, image capture operations may begin after floating diffusion node 58 has been cleared by a reset signal from reset transistor 60 and the required photo-diode PD1-PD4 is also reset to pinning voltage via the respective transfer gate TX-TX4. In an architecture in which four photodiodes share one floating diffusion node, as shown in FIG. 5, each PD has an integration starting point staggered by one readout time interval delay. This ensures sequential charge transfer from PD1-PD4 to the FD node for integration time t1, and reading out the corresponding source follower output signals in PO1 line 64-1 sequentially without added delay. While any one of the photodiodes is integrating, any one or more of the remaining photodiodes can be reset to pinning voltages through appropriate transfer gates TX1-TX4. After reset of a chosen PD, reset signal RES may be de-asserted and photodiodes 50-1, 50-2, 50-3, and 50-4 may begin generating charge, or continue to accumulate charge, in response to incident photons (e.g., one or more of photodiodes 50-1, 50-2, 50-3, and 50-4 may generate charge for the duration of a sequenced first integration time t1). After first integration time t1 has elapsed for PD1, a first transfer signal TX1 may be asserted to turn on transfer gate 52-1. Turning on transfer gate 52-1 allows charge generated by photodiode 50-1 to be transferred to shared floating diffusion node 58. Turning on transfer gate 52-1 may transfer all of the charge generated by photodiode 50-1 to shared floating diffusion node 58, effectively resetting the photodiode 50-1. Transfer signal TX1 may then be de-asserted to turn transfer gate 52-1 off, and pixel control and readout circuitry 28 (or other suitable control circuitry) may assert signals to read the output of source follower 62. Source follower 62 may couple the floating diffusion charge to one of pixel output lines 64. In the illustrative example in which pixel circuitry of the type shown in FIG. 5 is used to generate and couple charge to first pixel output line 64-1 in accordance with a first integration time t1, access port signal $\tau_1$ may be asserted and access port 56-1 may be turned on such that charge coupled through source follower 62 is transferred to pixel output line 64-1. In such an example, access port signal $\tau_1$ may be asserted while access port signals $\tau_2$ and $\tau_3$ may be de-asserted and access ports 56-2 and 56-3 may be turned off such that all charge generated by photodiode 50 during first integration time t1 is coupled onto and read out from pixel output line 64-1.

After charge generated by photodiode 50-1 has been transferred from shared floating diffusion node 58 to pixel output line 64-1 through source-follower transistor 62 and access port 56-1, reset signal RES may be asserted at reset gate 60 to reset shared floating diffusion node 58. After shared floating diffusion node 58 has been reset, a second transfer signal TX2 may be asserted to turn on transfer gate 52-2. At this time point, PD2 has been sequenced to complete its integration time of time interval t1. Turning on transfer gate 52-2 allows charge generated by photodiode 50-2 to be transferred to shared floating diffusion node 58. Turning on transfer gate 52-2 may transfer all of the charge generated by photodiode 50-2 to shared floating diffusion node 58, effectively resetting the photodiode 50-2. Transfer signal TX2 may then be de-asserted to turn transfer gate 52-2 off, and pixel control and readout circuitry 28 (or other suitable control circuitry) may assert signals to transfer the generated charge from shared floating diffusion node 58 to pixel output line 64-1 through source follower 62 and access port 56-1 as described above in connection with photodiode 50-1. When PD1 and PD2 charge integration is sequenced as described above (for example), the readout can occur with no break in between.

After charge generated by photodiode 50-2 has been transferred from shared floating diffusion node 58 to pixel output line 64-1 through source-follower transistor 62 and access port 56-1, reset signal RES may be asserted at reset gate 60 to reset shared floating diffusion node 58. After shared floating diffusion node 58 has been reset, a third transfer signal TX3 may be asserted to turn on transfer gate 52-3. Turning on transfer gate 52-3 allows charge generated by photodiode 50-3 to be transferred to shared floating diffusion node 58. Turning on transfer gate 52-3 may transfer all of the charge generated by photodiode 50-3 to shared floating diffusion node 58, effectively resetting the photodiode 50-3. Transfer signal TX3 may then be de-asserted to turn transfer gate 52-3 off, and pixel control and readout circuitry 28 (or other suitable control circuitry) may assert signals to transfer the generated charge from shared floating diffusion node 58 to pixel output line 64-1 through source follower 62 and access port 56-1 as described above in connection with photodiode 50-1.

After charge generated by photodiode 50-3 has been transferred from shared floating diffusion node 58 to pixel output line 64-1 through source-follower transistor 62 and access port 56-1, reset signal RES may be asserted at reset gate 60 to reset shared floating diffusion node 58. After shared floating diffusion node 58 has been reset, a fourth transfer signal TX4 may be asserted to turn on transfer gate 52-4. Turning on transfer gate 52-4 allows charge generated by photodiode 50-4 to be transferred to shared floating diffusion node 58. Turning on transfer gate 52-4 may transfer all of the charge generated by photodiode 50-4 to shared floating diffusion node 58, effectively resetting the photodiode 50-4. Transfer signal TX4 may then be de-asserted to turn transfer gate 52-4 off, and pixel control and readout circuitry 28 (or other suitable control circuitry) may assert signals to transfer the generated charge from shared floating diffusion node 58 to pixel output line 64-1 through source follower 62 and access port 56-1 as described above in connection with photodiode 50-1. If desired, PD1, PD2, PD3 and PD4 charge integration for time t1 is sequenced properly such that all readouts occur sequentially with no sit-time in between.

After charge generated by a given photodiode 50-1, 50-2, 50-3, and/or 50-4 during a first integration time t1 has been transferred to shared floating diffusion node 58 (e.g., the photodiode has been reset), the given photodiode may begin generating charge in accordance with a second integration time t2. For example, after charge generated by photodiode 50-1 during first integration time t1 is transferred to shared floating diffusion node 58, photodiode 50-1 may immediately start generating charge again (while the charge generated by each of photodiodes 50-2, 50-3, and 50-4 is read out, for example) for a second integration time t2. After second integration time t2 has elapsed, transfer signal TX1 may be asserted to transfer the charge generated by photodiode 50-1 during second integration time t2 to shared floating diffusion node 58. The charge generated by photodiode 50-1 during second integration time t2 may be transferred onto pixel output line 64-2 through access port 56-2 as described above in connection with the first integration time t1. Each of photodiodes 50-2, 50-3, and 50-4 may also generate charge for a second integration time that is read out on pixel output line 64-2 in the same manner as described above in connection with photodiode 50-1.

After charge generated by a given photodiode 50-1, 50-2, 50-3, and/or 50-4 during a second integration time t2 has been transferred to shared floating diffusion node 58 (e.g., the photodiode has been reset), the given photodiode may begin generating charge in accordance with a third integration time t3. These charges may be generated and read out as described above in connection with first and second integration times t1 and t2 (using third access port 56-3 and third pixel output line 64-3, for example). If desired, integration times t1, t2, and t3 may be chosen such that charge from only one of photodiodes 50-1, 50-2, 50-3, and 50-4 is stored on shared floating diffusion node 58 at any time. For example, t1 may be shorter than t2, and t2 may be shorter than t3. If desired, t2 may be longer than the total amount of time required to transfer the charge generated by each of photodiodes 50-2, 50-3, and 50-4 to pixel output line 64-1 through floating diffusion node 58, source follower 62, and access port 56-1. In this way, even though photodiode 50-1 begins to generate charge for second integration time t2 immediately after transferring the charge generated during first integration time t1, second integration time t2 will not have elapsed until the charge generated by each of photodiodes 50-2, 50-3, and 50-4 has been read out on pixel output line 64-1.

If desired, t3 may be longer than the total amount of time required to transfer the charge generated by each of photodiodes 50-2, 50-3, and 50-4 to pixel output line 64-2 through floating diffusion node 58, source follower 62, and access port 56-2. In this way, even though photodiode 50-1 begins to generate charge for third integration time t3 immediately after transferring the charge generated during second integration time t2, third integration time t3 will not have elapsed until the charge generated by each of photodiodes 50-2, 50-3, and 50-4 has been read out on pixel output line 64-2. In this way, the charges generated by each of photodiodes 50-1, 50-2, 50-3, and 50-4 for each integration time t1, t2, and t3 may be separately generated and read out (e.g., charge generated by a first photodiode during a first integration time in a first row of photodiodes is transferred onto a first row of shared floating diffusion nodes 58 while charge generated by a second row of photodiodes during a second integration time is transferred onto a second row of shared floating diffusion nodes 58). Charge that is coupled onto pixel output lines 64-1, 64-2, and/or 64-3 may be read out by pixel control and readout circuitry 28 and used to generate an image (e.g., a digital image and/or a high dynamic range image). Floating diffusions (58) charge coupled to output lines 64-1, 64-2, and 64-3 from three different rows (in pixels 22 of array 20 in FIG. 2, for example) may be read out simultaneously.

The examples described above in which each of photodiodes 50-1, 50-2, 50-3, and 50-4 generate charge that is read out separately is merely illustrative. For example, the charge generated by photodiodes 50-1, 50-2, 50-3, and 50-4 may be stored simultaneously on floating diffusion node 58 (e.g., the charge generated by the photodiodes may be "binned" or "summed" on floating diffusion node 58) and read out as a combined signal.

If desired, one or more of photodiodes 50-1, 50-2, 50-3, and 50-4 may be configured to generate charge in accordance with a different integration time. For example, photodiode 50-1 may be configured to generate charge for a first integration time t1, photodiode 50-3 may be configured to generate charge for a second integration time t2, and photodiodes 50-2 and 50-4 may be configured to generate charge in accordance with a third integration time t3. In such a scenario, photodiode 50-1 may generate charge that is read out on pixel output line 64-1, photodiode 50-3 may generate charge that is read out on pixel output line 64-2, and photodiodes 50-2 and 50-4 may generate charge that is read out on pixel output line 64-3 (e.g., charge generated by photodiodes 50-2 and 50-4 may be summed on shared floating diffuse node 58). In one suitable example, each of the first, second, and third integration times may begin at the same point in time. This, however, is merely illustrative. If desired, one or more of the various integration times may begin at staggered start times such that the integration times have a partial or no overlap. In one suitable arrangement, the first, second, and third photodiodes may begin generating charge at different times, but may be configured such that the first, second, and third integration times end simultaneously. In this way, charge may be transferred to each of pixel output lines 64-1, 64-2, and 64-3 simultaneously. In an example with four pixel readout lines, pixel integrations may be carried out for t1, t2, t3, and t4 times respectively.

While the examples described above in connection with FIG. 5 are described in connection with rolling shutter image capture operations (e.g., each image is captured on a row-by-row basis), this is merely illustrative. Image pixels 22 of the type shown and described in connection with FIG. 4 may be used in connection with any suitable image capture operations.

A given photodiode may have an associated full-well capacity that corresponds to the maximum number of electrons that the photodiode 50 can hold. For example, the full-well capacity of photodiode 50 may be considered to be F electrons. An analog-to-digital converter (in pixel control and readout circuitry 28, for example) can convert F electrons into $2^N$ codes. In conventional imaging systems, each code corresponds to a fixed number of electrons that the ADC receives from the photodiode 50 (e.g., the ADC can detect differences in the signal received from the photodiode in ten electron increments). If F is equal to 10,240 electrons (as an example), then the ADC will be able to generate 1,024 different codes based on different amounts of charge generated by the photodiode. In other words, the least significant bit (lsb) of the signal generated by the photodiode is 10 electrons.

In accordance with an embodiment of the present invention, signals generated by a photodiode 50 during first, second, and third integration times may have different least significant bit values. For example, a first integration time t1 may be shorter than a second integration time t2, and a third integration time t3 may be longer than the second integration time t2. In one illustrative example that is sometimes described herein, the ration of t3 to t2 may be $2^3$ (e.g., t3/t2 may equal $2^3$), and the ratio of t2 to t1 may be $2^3$ (e.g., t2/t1 may equal $2^3$). Using these ratios, an overall signal S that corresponds to the maximum signal that could have been generated by photodiode 50 during the longest integration time (which does not necessarily correspond to the full-well capacity F of the photodiode) is determined. For example, when the signal $S_3$ generated by the photodiode 50 during a third integration time t3 is less than the full-well capacity F of the photodiode 50 (e.g., the photodiode 50 did not become saturated during the longest integration time t3), then signal S is set to be equal to $S_3$. If the signal $S_3$ generated by photodiode 50 during integration time t3 is equal to the full-well capacity F of the photodiode 50 (e.g., the photodiode 50 became saturated during the longest integration time t3) but the signal $S_2$ generated by the photodiode 50 during a second integration time t2 is less than the full-well capacity F of the photodiode 50 (e.g., the photodiode 50 did not become saturated during the intermediate integration time t2), then the signal S is set to be equal to $(t3/t2)*S_2$. If both signals $S_3$ and $S_2$ generated by photodiode 50 during integration times t3 and t2, respectively, are equal to the full-well capacity F of the photodiode 50 (e.g., the photodiode 50 became saturated during both the longest integration time t3 and the intermediate integration time t2) but the signal $S_1$ generated by the photodiode 50 during a first integration time t1 is less than or equal to the full-well capacity F of the photodiode 50 (e.g., the photodiode 50 may or may not have become saturated during the shortest integration time t1), then the signal S is set to be equal to $(t3/t1)*S_1$. These relationships are shown in Equation 1 below.

$S=S_3$ when $S_3<F$ $S=(t3/t2)*S_2$ when $S_3=F$, and $S_2<F$ $S=(t3/t1)*S_1$ when $S_3=F,S_2=F$, and $S_1 \leq F$     Equation 1

By determining the integration times during which the photodiode was saturated and the integration times during which the photodiode was not saturated, a more accurate representation of the total amount of light incident on the photodiode can be determined (e.g., a photodiode that was saturated during all three integration times was exposed to more incident photons than a photodiode that was only saturated during the longest integration time). In the illustrative example described above, because $t3/t2=2^3$ and $t2/t1=2^3$, the ten bit signal that is generated by a photodiode in a conventional arrangement can be expanded to a sixteen bit signal. In this way, the dynamic ratio may be increased by approximately $20*(\log_{10}(2^6))$, which is equal to approximately 36 dB. If the ration of t1 to t2 to t3 (t1:t2:t3) equals $10^6:10^3:1$, the dynamic ratio improvement may be 120 dB.

Based on this adjusted representation of the amount of light received by photodiode 50, different least significant bit values for each of the signals $S_1$, $S_2$, and $S_3$ may be determined. In the illustrative example described above, for example, $S_3$ may be assigned a least significant bit value of 10 electrons, $S_2$ may be assigned a least significant bit value of 80 electrons, and $S_1$ may be assigned a least significant bit value of 640 electrons. In this way, the ADC may be able to generate 1,024 codes based on $S_3$, and 896 codes for $S_2$ and $S_1$. In other words, the signals that are relatively smaller (e.g., are indicative of relatively less light being incident upon photodiode 50) have a higher resolution, whereas the signals that are relatively larger (e.g., are indicative of relatively more light being incident upon photodiode 50) have a lower resolution.

Figure 6:
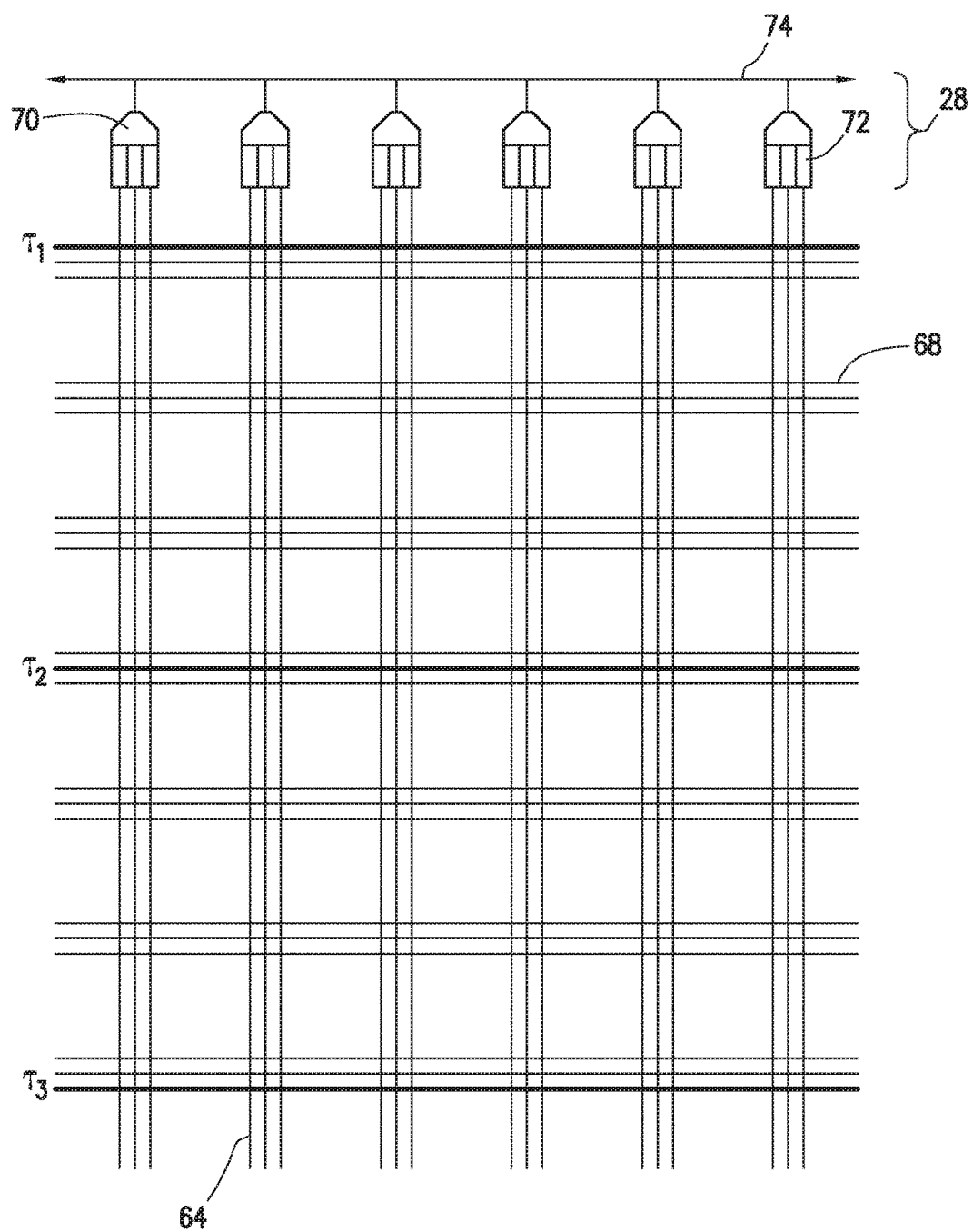
FIG. 6 is a diagram of illustrative pixel circuitry including a plurality of access port lines and pixel readout lines that may be associated with image pixels of the type shown and described in connection with FIGS. 3-5.

An illustrative example of pixel circuitry in pixel array 22 that may be associated with image pixels 22 having multiple access ports 56 in an image pixel array 20 is shown in FIG. 6. As shown in FIG. 6, multi-port pixel circuitry may include a plurality of access port lines 68 (as part of row address lines 30, for example) on which access port signals τ are provided to access ports 56 in pixels 22 and a plurality of pixel output lines 64 (as part of column readout lines 32, for example) on which image signals generated by photodiodes 50 are read out. Each row and each column of pixel array 22 may have three corresponding access port lines 68 (for asserting access port signals $\tau_1$, $\tau_2$, and $\tau_3$, respectively) and three pixel output lines 64 on which signals generated by photodiodes 50 during integration times t1, t2, and t3 are read out. Each group of three pixel output lines 64 may be electrically coupled (connected) to column control and readout circuitry 28 that includes parallel signal processing elements 72 and serial signal processing elements 70. Parallel circuits 72 may be configured to concurrently process signals that are received from a first pixel output line 64-1 in a given first row on which a first pixel signal generated during a first integration time is read out, from a second pixel output line 64-2 in a given second row on which a second pixel signal generated during a second integration time is read out, and from a third pixel output line 64-3 in a given third row on which a third pixel signal generated during a third integration time is read out. For example, parallel circuits 72 may include capacitors to store correlated double sampling voltage levels for each pixel output line 64. Serial signal processing element 70 may process the signals stored in parallel circuits 72 in a serial manner. If desired, serial circuits 70 may execute at a rate that is three times greater (or more) than typical to time multiplex and process the stored signals. In this way, it may not be necessary to triplicate all components of column control and readout circuitry 28. If desired, the three signals stored in parallel circuits 72 may be processed to a single signal using Equation 1. The single signal may then be transmitted on a system bus 74 (to control and processing circuitry 24, for example).

Although the examples above are described with reference to pixel circuitry having three access ports that transfer electrical charges generated during three different integration times to three different pixel output lines, this is merely illustrative. In general, pixel circuitry in accordance with embodiments of the present invention may be configured to have any suitable number (e.g., two, or more than three) of access ports that transfer electrical charges generated during any suitable number (e.g., two, or more than three) of different integration times to any suitable number (e.g., two, or more than three) of different pixel output lines.

Figure 7:
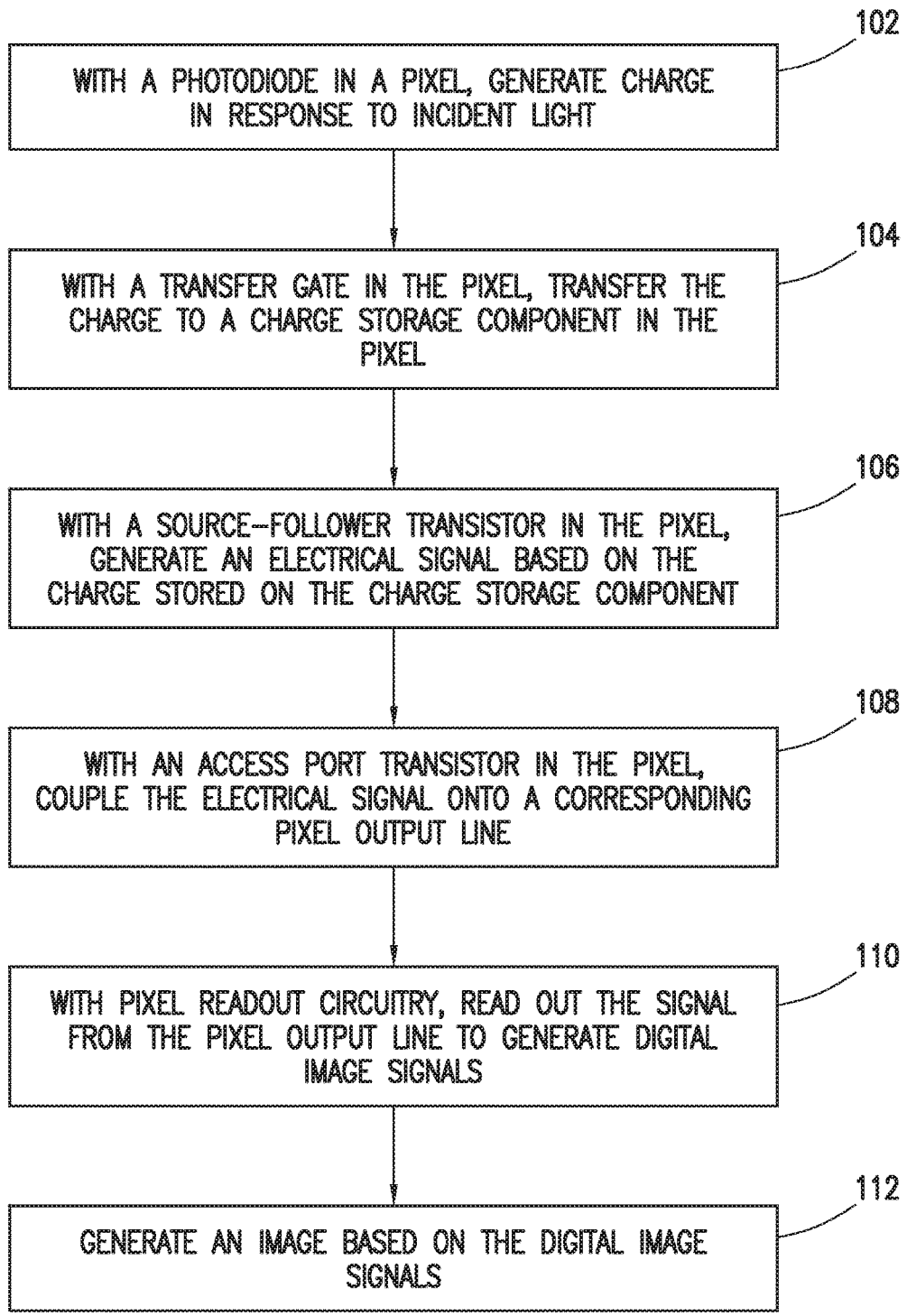
FIG. 7 is a flow chart of illustrative steps that may be performed in generating an image using multi-port image pixels in accordance with an embodiment of the present invention.

A flow chart of illustrative steps that may be performed in generating an image using a pixel having multiple access ports as discussed above in connection with FIGS. 1-6 is shown in FIG. 7.

At step 102, a photodiode in a pixel may generate electrical charge in response to light that is incident upon the photodiode.

At step 104, a transfer gate (such as transfer gate 52, for example) may be used (turned on) to transfer the electrical charge from the photodiode to a charge storage component in the pixel (e.g., storage diode 54 or floating diffusion node 58).

At step 106, a source-follower transistor in the pixel may be used (turned on) to generate an electrical signal from the charge stored on the charge storage component.

At step 108, an access port transistor (such as access port transistor 56, for example) may be used (turned on) to couple the electrical signal onto a corresponding pixel output line 64 (e.g., the charge from the charge storage component may be coupled to the pixel output line through the source follower transistor and the access port transistor).

At step 110, pixel readout circuitry (such as pixel control and readout circuitry 28, for example) may be used to read out the signal from the pixel output line to generate digital image signals.

At step 112, an image (e.g., a high dynamic range image) may be generated based on the digital image signals.

Figure 8:
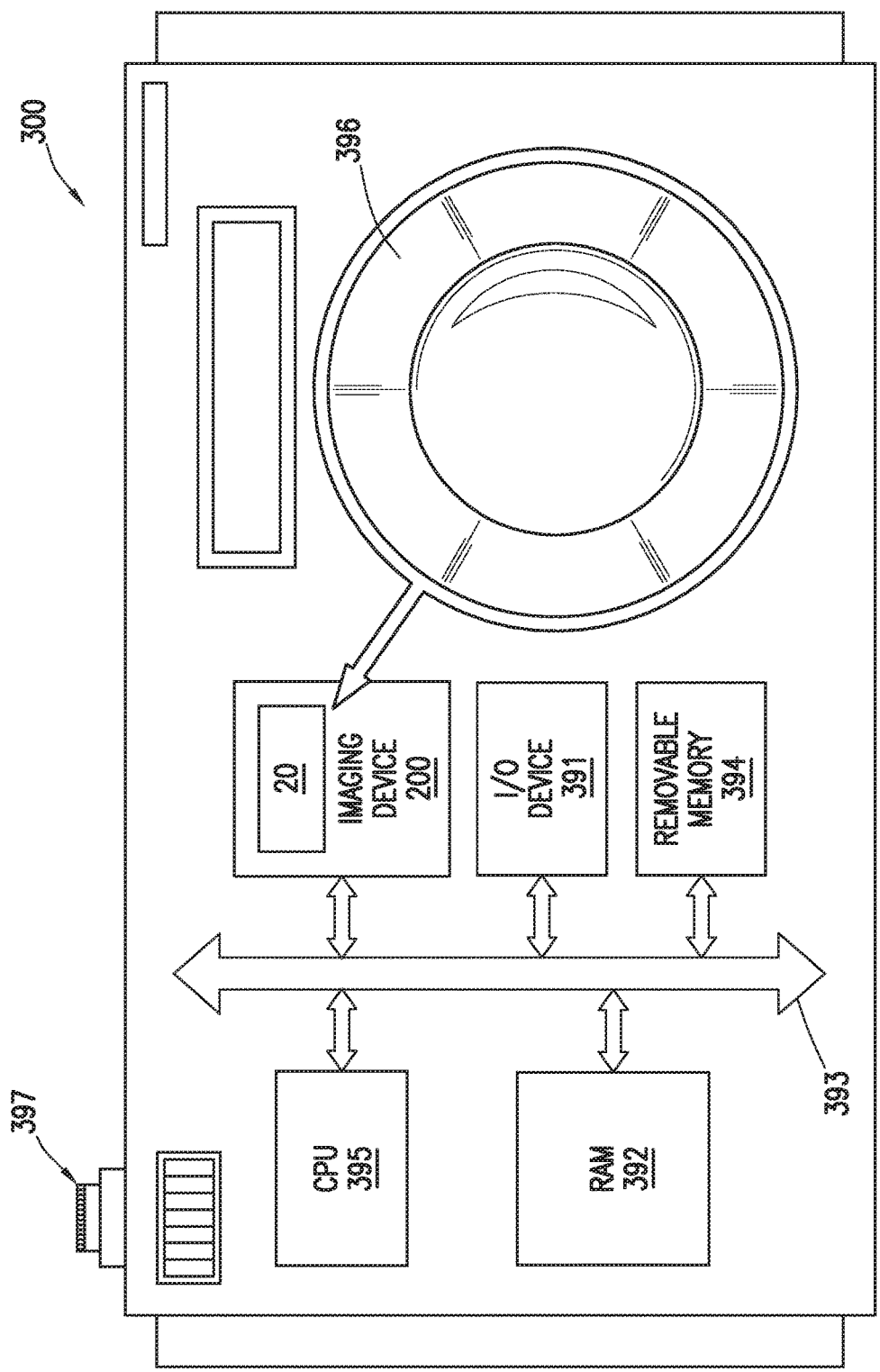
FIG. 8 is a block diagram of an illustrative processor system employing the embodiments of FIGS. 1-7 in accordance with an embodiment of the present invention.

FIG. 8 shows in simplified form a typical processor system 300, such as a digital camera, which includes an imaging device 200 (e.g., an imaging device 200 such as device 10 of FIGS. 1-7 having pixels with multiple access ports 56). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating an electronic device (see, e.g., device 10 of FIG. 1) that includes an imaging system. An imaging system may include one or more image sensors. Each image sensor may include an array of image pixels formed on a semiconductor substrate. Each image pixel may include one or more photosensitive elements configured to convert incoming light into electric charges. The imaging system may include pixel control and readout circuitry for reading out the electric charges generated by the image pixels. Image signal processing circuitry that is part of the imaging system or otherwise included in device 10 may generate an image based on the image signals read out by the image pixels.

In accordance with an embodiment of the present invention, a pixel may include a photodiode that generates first and second (separate) electrical charges during first and second (different) integration times. The pixel may include two or more output lines coupled to the photodiode. The output lines may be coupled (directly) to pixel readout circuitry that may include, for example, analog-to-digital converter circuitry. The first electrical charge may be coupled to a first one of the output lines and read out by the pixel readout circuitry. The second electrical signal may be coupled to a second one of the output lines and read out by the pixel readout circuitry. Access ports interposed between the photodiode and the output lines may determine the output line onto which the first and second electrical charges are coupled. The first and second integration times may be part of a total frame exposure time for an image sensor in which the pixel is formed. In this way, the photodiode may generate more than one (e.g., two or more) electrical signals during a single frame exposure (e.g., a single pixel can generate multiple image signals having different exposure levels during a single frame capture). If desired, both the first and second image signals may be used to generate a high dynamic range image based (only) on image signals generated during the single frame capture.

In accordance with an embodiment of the present invention, a pixel array may include a first image pixel and a second image pixel arranged in a single given column of the pixel array. The first and second image pixels may be formed in different rows of the array. Each of the first and second pixels may include a photodiode that is coupled to a plurality of column readout lines (e.g., both the first photodiode and the second photodiode are directly electrically coupled to at least both a first column readout line and a second column readout line). If desired, electrical signals generated by the first and second photodiodes may be read out on the column readout lines using column readout circuitry. In one suitable arrangement, the first and second photodiodes generate first and second electrical signals in response to incident light. The first and second electrical signals may be generated using different exposure times. The first and second electrical signals generated using the first and second different exposure times may be coupled to first and second respective column readout lines (e.g., both photodiodes may be coupled to both readout lines). The first and second signals may be read out on the first and second readout lines simultaneously. In this way, multiple image signals may be simultaneously generated by different pixels using different integration times and simultaneously read out from a single column of the pixel array. If desired, the different integration times may begin or end at the same time (e.g., at the start or end of a global integration time during which the first and second integration times elapse).

In accordance with an embodiment of the present invention, a method of operating a pixel array in an image sensor may include generating first and second electrical signals with first and second image pixels in a single column of the pixel array using first and second different integration times for first and second different respective photodiodes. If desired, the first and second image signals may be generated at the same time (e.g., simultaneously or concurrently). The first and second image signals may be transferred to output lines in the pixel array through first and second respective output gates. The output gates may be separate between the two pixels (e.g., each pixel may have its own output gates), while the output lines may be shared between the first and second pixels (e.g., both pixels may each be coupled to every output line in a given plurality of output lines). Output transfer signals may be asserted to activate the output gates and to transfer the electrical signals onto the output lines. The electrical signals generated by the first and second photodiodes may be transferred to different respective first and second output lines such that different pixels in a single given column of the pixel array simultaneously generate and simultaneously output image signals generated using different respective integration times during a single exposure of the pixel array. If desired, the electrical signals may be read out to column readout circuitry and used to generate a high dynamic range image.

The foregoing is merely illustrative of the principles of this invention and various modifications can be made by those skilled in the art without departing from the scope and spirit of the invention. The foregoing embodiments may be implemented individually or in any combination.

What is claimed is:

1. A pixel comprising:
   a photodiode that generates first and second electrical signals in response to incident light during first and second respective integration times;
   first and second access ports coupled to the photodiode, wherein the first access port couples the first electrical signal to a first output line and the second access port couples the second electrical signal to a second output line; and
   a source follower transistor that couples the photodiode to the first and second access ports, wherein the first and second access ports comprise first and second transistors that are interposed between the source follower transistor and the first and second output lines.

2. The pixel of claim 1, wherein the first and second electrical signals are generated by the photodiode during a single frame exposure time.

3. The pixel of claim 2, wherein the second integration time begins after the first integration time has ended.

4. The pixel of claim 1, further comprising:
   a floating diffusion node coupled to the photodiode, wherein the first electrical signal is transferred to the floating diffusion node after the first integration time, and wherein the second electrical signal is transferred to the floating diffusion node after the second integration time.

5. The pixel of claim 4, wherein the first and second electrical signals are coupled from the floating diffusion node to the first and second output lines through the first and second access ports.

6. The pixel of claim 4, wherein the second electrical signal is at least partially generated while the first electrical signal is stored on the floating diffusion node.

7. A pixel array having a plurality of pixels arranged in rows and columns, the pixel of array comprising:
   first and second pixels in a common column of the pixel array, wherein the first pixel comprises a first photodiode and the second pixel comprises a second photodiode, wherein the first and second photodiodes generate electrical charge in response to incident light; and
   a plurality of column readout lines, wherein each of the plurality of column readout lines is coupled to the first photodiode and to the second photodiode, wherein the first pixel comprises a plurality of readout transistors and the second pixel comprises second a plurality of readout transistors, and wherein each of the of readout transistors in the first and second pluralities of readout transistors couples the electrical charge onto a corresponding one of the plurality of column readout lines, wherein the first pixel further comprises:
      a first floating diffusion node on which the electrical charge is stored; and
      a first transfer gate that transfers the electrical charge from the photodiode to the first floating diffusion node; and
      a first source follower transistor, wherein the first plurality of readout transistors is interposed between the first source follower transistor and the column readout lines, wherein the first source follower transistor couples the charge from the first floating diffusion node to at least one of the column readout lines through at least one of the first plurality of readout transistors, and wherein the second pixel comprises:
a second floating diffusion node on which the electrical charge is stored; and
a second transfer gate that transfers the electrical charge from the photodiode to the second floating diffusion node; and
a second source follower transistor, wherein the second plurality of readout transistors is interposed between the second source follower transistor and the column readout lines, wherein the second source follower transistor couples the charge from the second floating diffusion node to at least one of the column readout lines through at least one of the second plurality of readout transistors.

8. The pixel array of claim 7, wherein the first plurality of readout transistors comprises a first readout transistor that couples the electrical charge generated by the photodiode in the first pixel onto a first one of the plurality of column readout lines, and wherein the second plurality of readout transistors comprises a second readout transistor that couples the electrical charge generated by the photodiode in the second pixel onto a second one of the plurality of column readout lines.

9. The pixel array of claim 8, wherein the electrical charge generated by the first photodiode is read out on the first column readout line while the electrical charge generated by the second photodiode is read out on the second readout line.

10. The pixel array of claim 7, wherein the first pixel generates a first electrical charge during a first exposure time, and wherein the second pixel generates a second electrical charge during a second exposure time that is different than the first exposure time.

11. The pixel array of claim 10, wherein the pixel array is configured to generate a frame of image data during an overall frame exposure time, and wherein the first and second exposure times elapse during the overall frame exposure time.

12. A method of operating an image sensor having a pixel array with a plurality of pixels arranged in rows and columns, the method comprising:
with first and second photodiodes in first and second pixels in a given column in the pixel array, generating electrical charge in response to received light;
asserting a first output transfer signal to activate a first output gate in the first pixel, wherein activating the output gate couples the electrical charge generated by the first photodiode to a first output line that is coupled to both the first and second photodiodes;
while asserting the first output transfer signal, asserting a second output transfer signal to activate a second output gate in the second pixel, wherein activating the second output gate couples the electrical charge generated by the second photodiode to a second output line that is coupled to both the first and second photodiodes such that the electrical charges generated by the first and second photodiodes are read out at the same time, and wherein at least one of the first and second pixels comprises a floating diffusion node and a source follower transistor, the method further comprising:
with a transfer gate, transferring the electrical charge to the floating diffusion node; and
with the source follower transistor, coupling the electrical charge from the floating diffusion node to at least one of the first and second output lines through at least one of the first and second output gates.

13. The method of claim 12, wherein generating the electrical charge comprises generating the electrical charge with the first photodiode for a first integration time and generating the electrical charge with the second photodiode for a second integration time that is different than the first integration time.

14. The method of claim 13, wherein the first and second integration times begin at the same time.

15. The method of claim 13, wherein the first and second integration times end at the same time.

16. The method of claim 13, wherein the electrical charges generated by the first and second photodiodes are read out at the same time using readout circuitry that is coupled to the pixel array, the method further comprising:
with the readout circuitry, converting the electrical charges into digital image signals; and
generating a high dynamic range image using the digital image signals.

17. The method of claim 13, wherein the first and second integration times occur during a global integration time corresponding to a single exposure of the pixel array.

* * * * *